US011082719B2

(12) United States Patent
Hannuksela et al.

(10) Patent No.: US 11,082,719 B2
(45) Date of Patent: Aug. 3, 2021

(54) APPARATUS, A METHOD AND A COMPUTER PROGRAM FOR OMNIDIRECTIONAL VIDEO

(71) Applicant: Nokia Technologies Oy, Espoo (FI)

(72) Inventors: Miska Hannuksela, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/626,726

(22) PCT Filed: May 22, 2018

(86) PCT No.: PCT/FI2018/050382
§ 371 (c)(1),
(2) Date: Dec. 26, 2019

(87) PCT Pub. No.: WO2019/008221
PCT Pub. Date: Jan. 10, 2019

(65) Prior Publication Data
US 2020/0288171 A1    Sep. 10, 2020

(30) Foreign Application Priority Data
Jul. 3, 2017    (FI) .................................... 20175640

(51) Int. Cl.
*H04N 13/161*    (2018.01)
*H04N 19/597*    (2014.01)
(Continued)

(52) U.S. Cl.
CPC ......... *H04N 19/597* (2014.11); *H04N 13/161* (2018.05); *H04N 19/167* (2014.11); *H04N 19/176* (2014.11)

(58) Field of Classification Search
None
See application file for complete search history.

(56) References Cited

U.S. PATENT DOCUMENTS 7,965,314 B1    6/2011  Miller et al.
8,208,790 B2    6/2012  Toma et al.
(Continued)

FOREIGN PATENT DOCUMENTS

CN    103561255 A    2/2014
WO    2016/055688 A1    4/2016
WO    2017/093611 A1    6/2017

OTHER PUBLICATIONS

"Information Technology—Coding of Audio-Visual Objects—Part 15: Advanced Video Coding (AVC) File Format", ISO/IEC 14496-15, First edition, Apr. 15, 2004, 29 pages.
(Continued)

*Primary Examiner* — Christopher G Findley
(74) *Attorney, Agent, or Firm* — Harrington & Smith

(57) ABSTRACT

There are disclosed various methods, apparatuses and computer program products for video encoding and decoding. In some embodiments a bitstream comprising a coded first-view picture and a coded second-view picture is encoded or encapsulated. The coded second-view picture represents a smaller field of view than the coded first-view picture, wherein decoding of the coded first-view picture results in a decoded first-view picture, and decoding of the coded second-view picture results in a decoded second-view picture. An indication is inserted in or along the bitstream that a reconstructed second-view picture comprises the decoded second-view picture and at least one region of the decoded first-view picture, wherein the reconstructed second-view picture represents the same field of view as the decoded first-view picture.

21 Claims, 16 Drawing Sheets

(51) Int. Cl.
*H04N 19/167* (2014.01)
*H04N 19/176* (2014.01)

(56) References Cited

U.S. PATENT DOCUMENTS

| | | | |
|---|---|---|---|
| 8,625,973 | B2 | 1/2014 | Pardue |
| 8,855,210 | B2 | 10/2014 | Cho et al. |
| 2002/0180759 | A1 | 12/2002 | Park et al. |
| 2011/0280300 | A1 | 11/2011 | Tourapis et al. |
| 2011/0280311 | A1 | 11/2011 | Chen et al. |
| 2014/0005484 | A1 | 1/2014 | Charles |
| 2014/0037007 | A1 | 2/2014 | Lee et al. |
| 2014/0071229 | A1 | 3/2014 | Weerasinghe |
| 2014/0210949 | A1 | 7/2014 | Berkovich et al. |
| 2014/0241433 | A1 | 8/2014 | Bosse et al. |
| 2014/0247873 | A1 | 9/2014 | Bosse et al. |
| 2016/0366392 | A1 | 12/2016 | Raghoebardajal et al. |
| 2018/0025467 | A1* | 1/2018 | Macmillan .............. G06T 15/20 382/190 |
| 2018/0192074 | A1* | 7/2018 | Shih ..................... H04N 19/597 |
| 2019/0199995 | A1* | 6/2019 | Yip ........................... G06T 3/00 |
| 2019/0373245 | A1* | 12/2019 | Lee ................ H04N 21/234345 |
| 2020/0228776 | A1* | 7/2020 | Deshpande .......... H04N 13/161 |

OTHER PUBLICATIONS

Siegel et al., "Compression of Stereo Image Pairs and Streams", Stereoscopic Displays and Virtual Reality Systems, Apr. 15, 1994, 10 pages.

"Advanced Video Coding for Generic Audiovisual Services", Series H: Audiovisual and Multimedia Systems Infrastructure of audiovisual services—Coding of moving video, Recommendation ITU-T H.264, Apr. 2017, 812 pages.

"High Efficiency Video Coding", Series H: Audiovisual and Multimedia Systems Infrastructure of audiovisual services—Coding of moving video, Recommendation ITU-T H.265, Dec. 2016, 664 pages.

"Information Technology—Coding of Audio visual Objects—Part 12: ISO Base Media File Format", ISO/IEC 14496-12, Fifth edition, Dec. 15, 2015, 248 pages.

"Information technology—Coding of Audio-visual Objects—Part 14 MP4 File Format", ISO/IEC 14496-14, First edition, Nov. 15, 2003, 18 pages.

"3rd Generation Partnership Project; Technical Specification Group Services and System Aspects; Transparent end-to-end packet switched streaming service (PSS); 3GPP file format (3GP) (Release 14)", 3GPP TS 26.244 V14.0.0, Mar. 2017, pp. 1-67.

"Video Coding for Low Bit Rate Communication", Series H: Audiovisual and Multimedia Systems Infrastructure of audiovisual services—Coding of moving video, ITU-T Recommendation H.263, Jan. 2005, 226 pages.

Office action received for corresponding Finnish Patent Application No. 20175640, dated Feb. 13, 2018, 9 pages.

International Search Report and Written Opinion received for corresponding Patent Cooperation Treaty Application No. PCT/FI2018/050382, dated Oct. 10, 2018, 18 pages.

Extended European Search Report received for corresponding European Patent Application No. 18828226.3, dated Oct. 5, 2020, 10 pages.

* cited by examiner

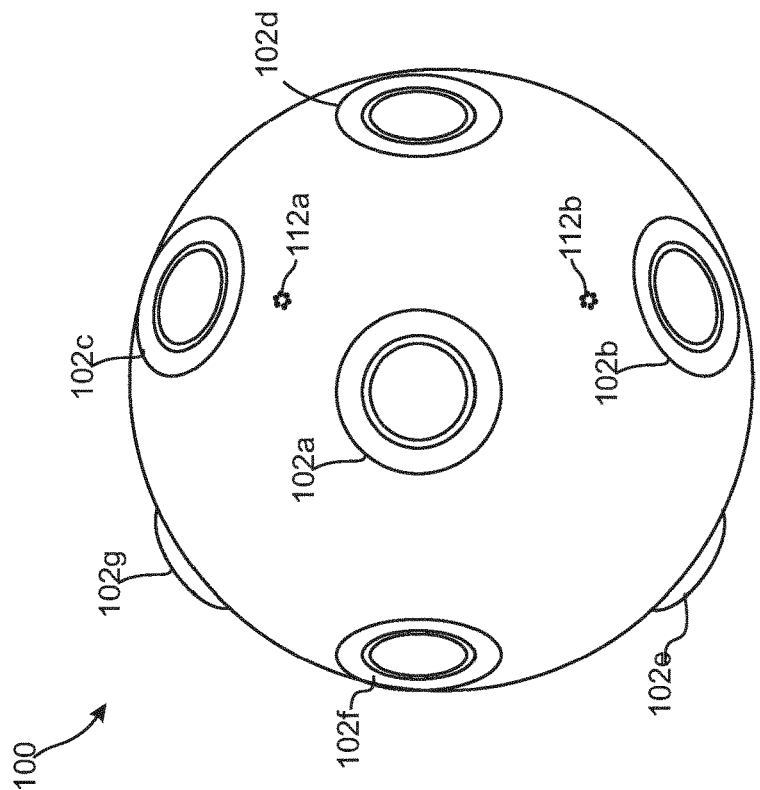
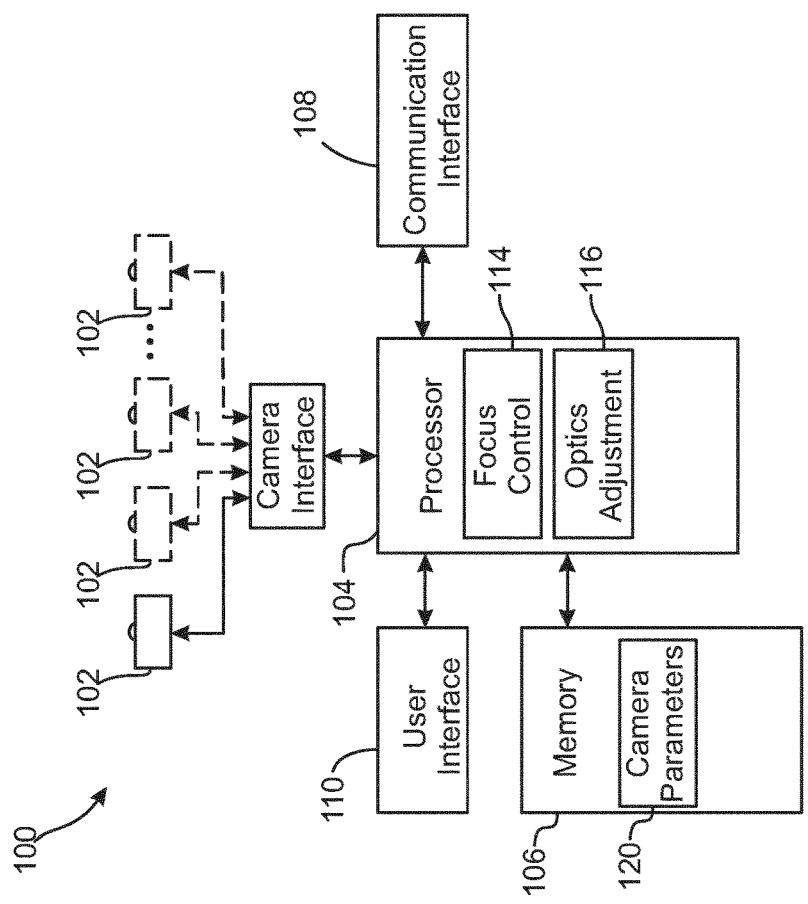
Fig. 1b
Fig. 1a

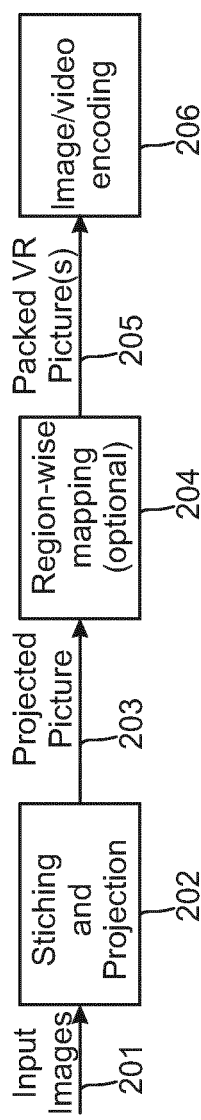
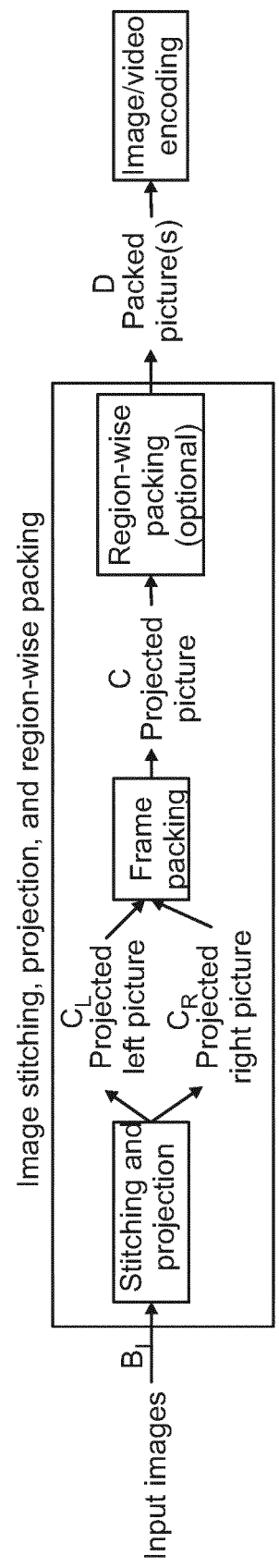

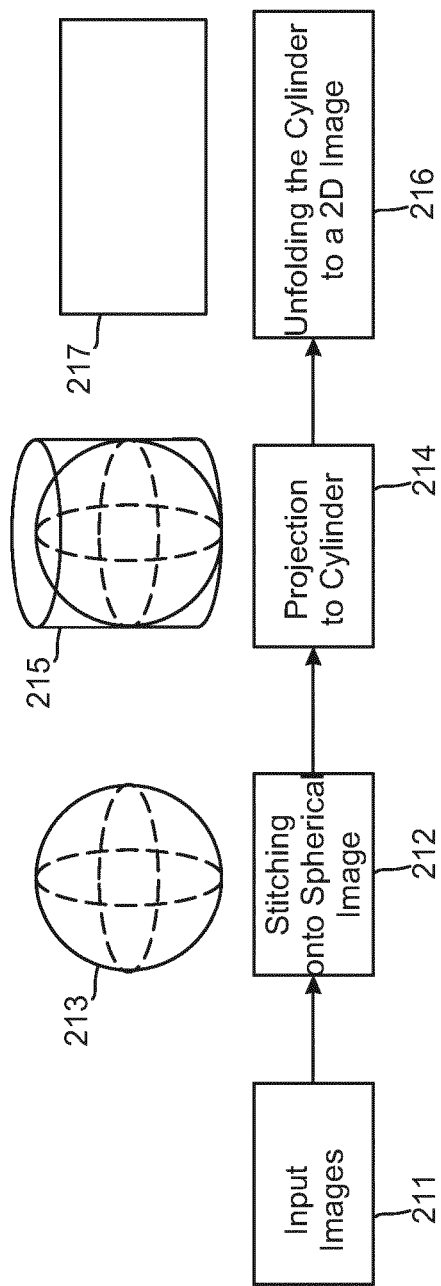

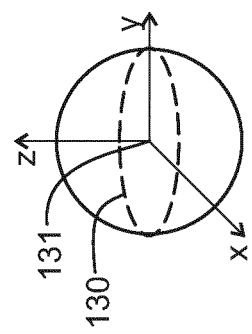
Fig. 3a
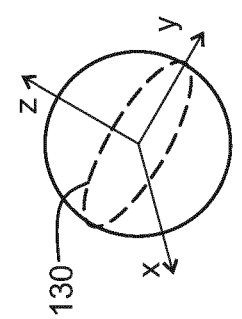
Fig. 3b
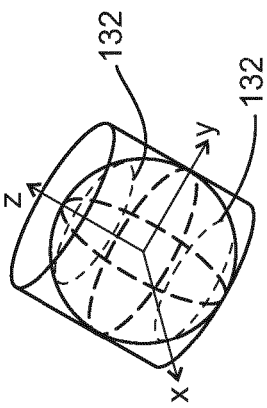
Fig. 3c
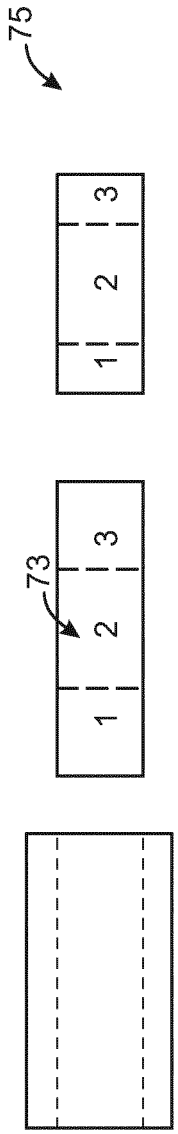
Fig. 3d
Fig. 3e
Fig. 3f

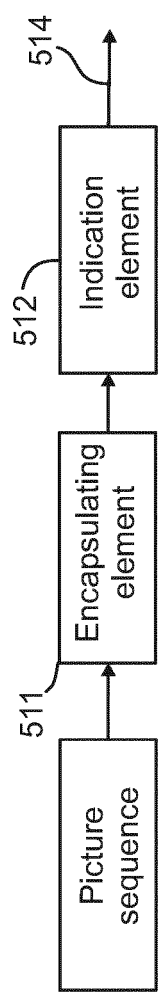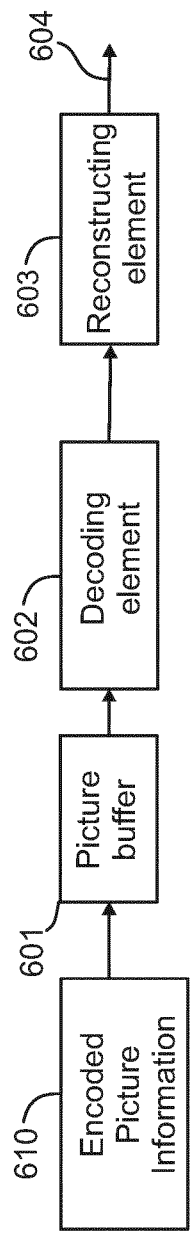

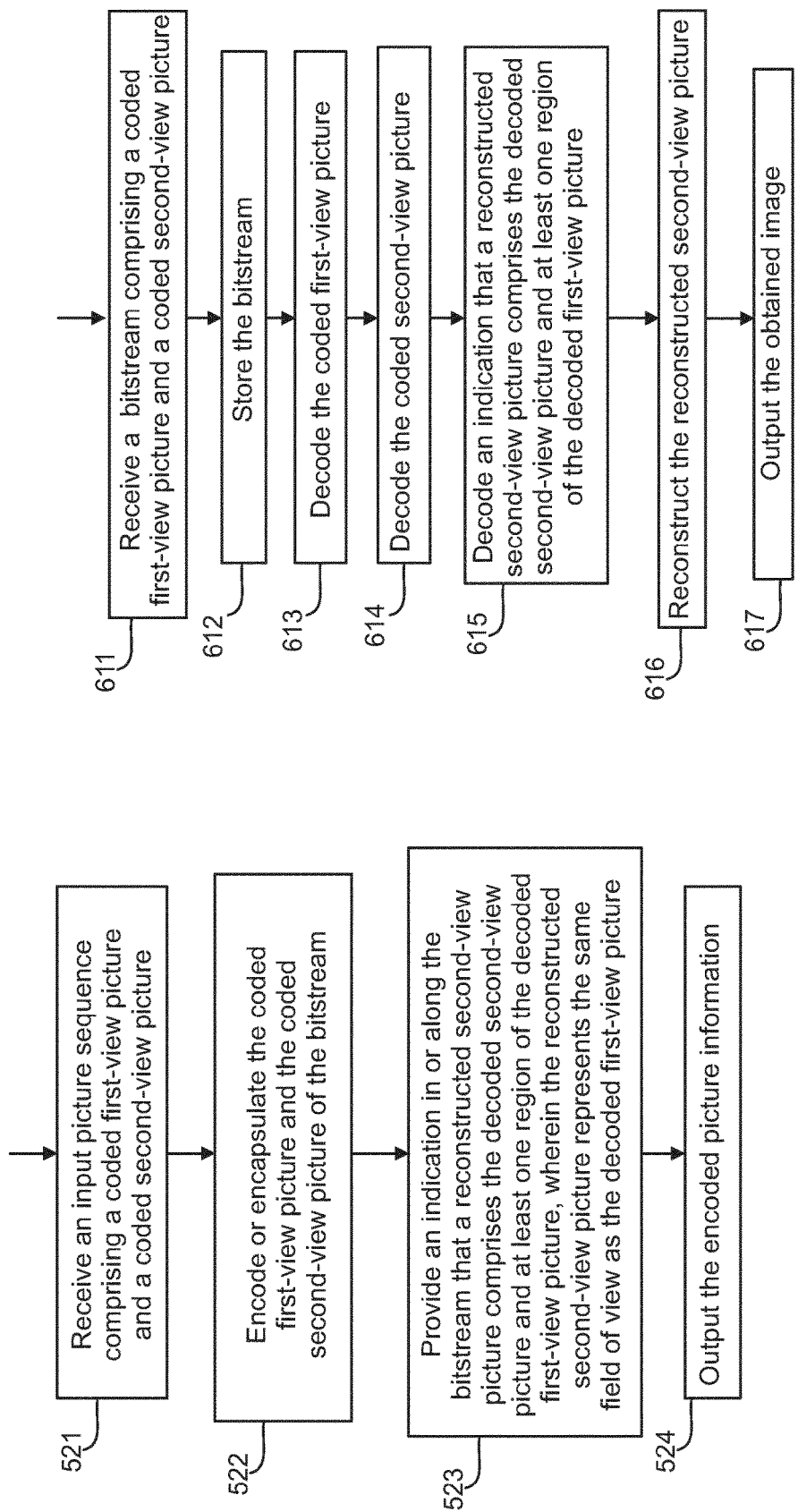

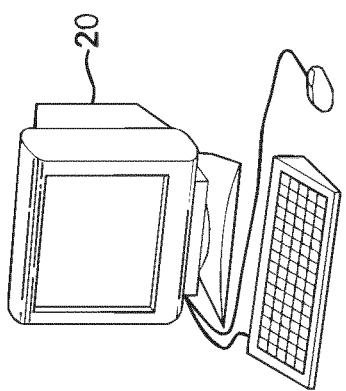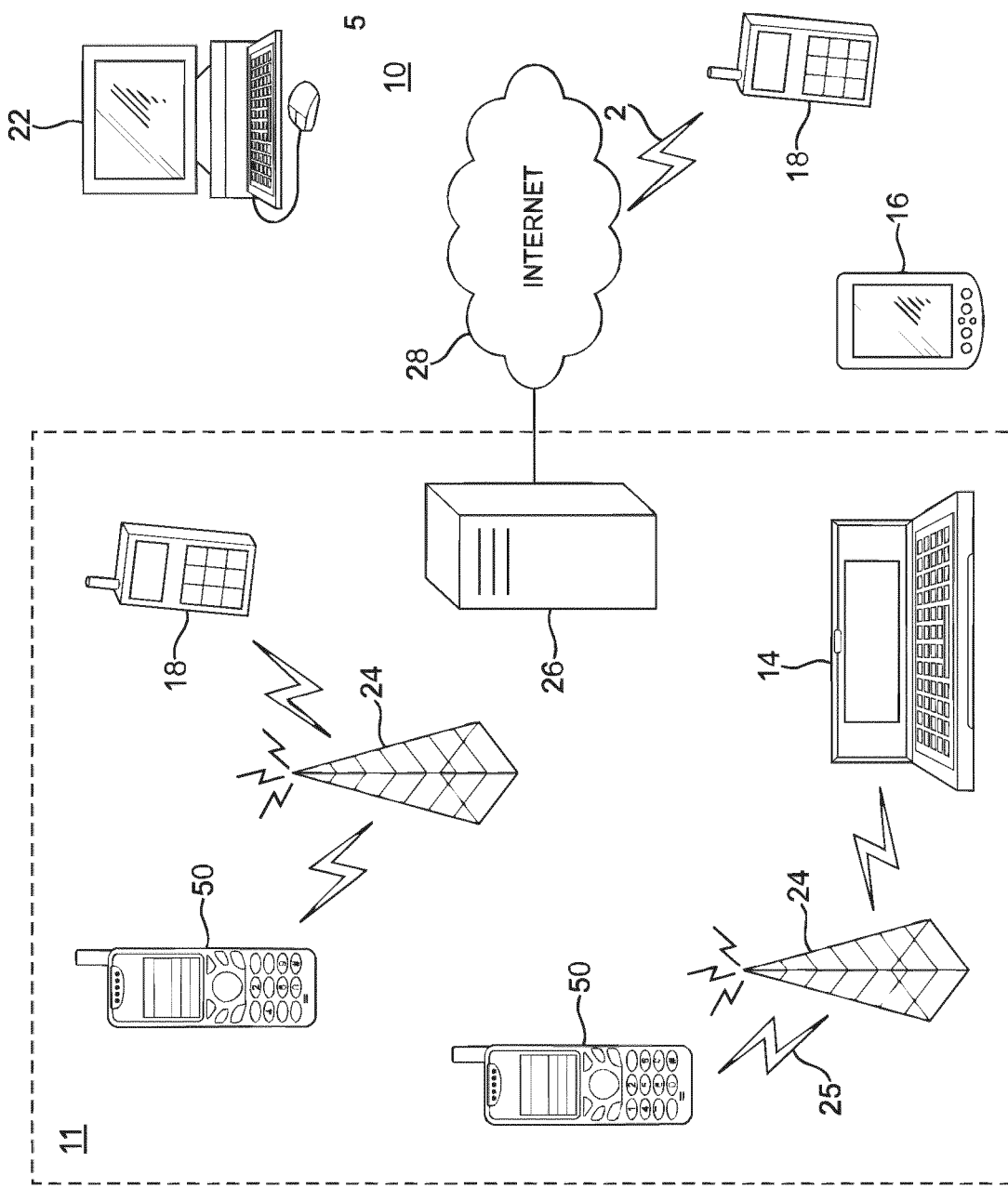
Fig. 14

APPARATUS, A METHOD AND A COMPUTER PROGRAM FOR OMNIDIRECTIONAL VIDEO

RELATED APPLICATION

This application was originally filed as PCT Application No. PCT/FI2018/050382, filed on May 22, 2018, which claims priority from FI Application No. 20175640, filed on Jul. 3, 2017.

TECHNICAL FIELD

The present invention relates to an apparatus, a method and a computer program for resolution-adaptive tile merging for viewport-adaptive streaming of omnidirectional video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard (H.264/AVC), the Multiview Video Coding (MVC) extension of H.264/AVC or scalable extensions of HEVC (High Efficiency Video Coding) can be used.

SUMMARY

Some embodiments provide a method for encoding and decoding video information. In some embodiments of the present invention there is provided a method, apparatus and computer program product for video coding as well as decoding.

Various aspects of examples of the invention are provided in the detailed description.

According to a first aspect, there is provided a method comprising:

encoding or encapsulating a bitstream comprising a coded first-view picture and a coded second-view picture, wherein the coded second-view picture represents a smaller field of view than the coded first-view picture, decoding of the coded first-view picture results in a decoded first-view picture, decoding of the coded second-view picture results in a decoded second-view picture, wherein the method further comprises indicating in or along the bitstream that a reconstructed second-view picture comprises the decoded second-view picture and at least one region of the decoded first-view picture, wherein the reconstructed second-view picture represents the same field of view as the decoded first-view picture.

According to a second aspect, there is provided a method comprising:

receiving a bitstream comprising a coded first-view picture and a coded second-view picture, wherein the coded second-view picture represents a smaller field of view than the coded first-view picture, decoding the coded first-view picture, wherein the decoding results into a decoded first-view picture, decoding the coded second-view picture, wherein the decoding results into a decoded second-view picture, decoding from or along a bitstream that a reconstructed second-view picture comprises the decoded second-view picture and at least one region of the decoded first-view picture, wherein the reconstructed second-view picture represents the same field of view as the decoded first-view picture, and reconstructing the reconstructed second-view picture accordingly.

An apparatus according to a third aspect comprises at least one processor and at least one memory, said at least one memory stored with code thereon, which when executed by said at least one processor, causes the apparatus to perform at least:

encode or encapsulate a bitstream comprising a coded first-view picture and a coded second-view picture, wherein the coded second-view picture represents a smaller field of view than the coded first-view picture, decoding of the coded first-view picture results in a decoded first-view picture, decoding of the coded second-view picture results in a decoded second-view picture, and indicate in or along the bitstream that a reconstructed second-view picture comprises the decoded second-view picture and at least one region of the decoded first-view picture, wherein the reconstructed second-view picture represents the same field of view as the decoded first-view picture.

An apparatus according to a fourth aspect comprises at least one processor and at least one memory, said at least one memory stored with code thereon, which when executed by said at least one processor, causes the apparatus to perform at least:

receive a bitstream comprising a coded first-view picture and a coded second-view picture, wherein the coded second-view picture represents a smaller field of view than the coded first-view picture, decode the coded first-view picture, wherein the decoding results into a decoded first-view picture, decode the coded second-view picture, wherein the decoding results into a decoded second-view picture, decode from or along a bitstream that a reconstructed second-view picture comprises the decoded second-view picture and at least one region of the decoded first-view picture, wherein the reconstructed second-view picture represents the same field of view as the decoded first-view picture, and reconstruct the reconstructed second-view picture accordingly.

A computer readable storage medium according to a fifth aspect comprises code for use by an apparatus, which when executed by a processor, causes the apparatus to perform:

obtain a first coded tile or sub-picture track and a second coded tile or sub-picture track, the first and second coded tile or sub-picture tracks representing a different spatial part of an input video sequence, and the first and second coded tile or sub-picture tracks having the same width and height in pixels;

encode or encapsulate a bitstream comprising a coded first-view picture and a coded second-view picture, wherein the coded second-view picture represents a smaller field of view than the coded first-view picture, decoding of the coded first-view picture results in a decoded first-view picture, decoding of the coded second-view picture results in a decoded second-view picture, and indicate in or along the bitstream that a reconstructed second-view picture comprises the decoded second-view picture and at least one region of the decoded first-view picture, wherein the reconstructed second-view picture represents the same field of view as the decoded first-view picture.

A computer readable storage medium according to a sixth aspect comprises code for use by an apparatus, which when executed by a processor, causes the apparatus to perform:

receive a bitstream comprising a coded first-view picture and a coded second-view picture, wherein the coded second-view picture represents a smaller field of view than the coded first-view picture, decode the coded first-view picture, wherein the decoding results into a decoded first-view picture, decode the coded second-view picture, wherein the decoding results into a decoded second-view picture, decode from or along a bitstream that a reconstructed second-view picture comprises the decoded second-view picture and at least one region of the decoded first-view picture, wherein the reconstructed second-view picture represents the same field of view as the decoded first-view picture, and reconstruct the reconstructed second-view picture accordingly.

An apparatus according to a seventh aspect comprises:

means for encoding or encapsulating a bitstream comprising a coded first-view picture and a coded second-view picture, wherein the coded second-view picture represents a smaller field of view than the coded first-view picture, decoding of the coded first-view picture results in a decoded first-view picture, decoding of the coded second-view picture results in a decoded second-view picture, and means for indicating in or along the bitstream that a reconstructed second-view picture comprises the decoded second-view picture and at least one region of the decoded first-view picture, wherein the reconstructed second-view picture represents the same field of view as the decoded first-view picture.

An apparatus according to a seventh aspect comprises:

means for receiving a bitstream comprising a coded first-view picture and a coded second-view picture, wherein the coded second-view picture represents a smaller field of view than the coded first-view picture, means for decoding the coded first-view picture, wherein the decoding results into a decoded first-view picture, means for decoding the coded second-view picture, wherein the decoding results into a decoded second-view picture, means for decoding from or along a bitstream that a reconstructed second-view picture comprises the decoded second-view picture and at least one region of the decoded first-view picture, wherein the reconstructed second-view picture represents the same field of view as the decoded first-view picture, and means for reconstructing the reconstructed second-view picture accordingly.

Further aspects include at least apparatuses and computer program products/code stored on a non-transitory memory medium arranged to carry out the above methods.

BRIEF DESCRIPTION OF THE DRAWINGS

For a more complete understanding of example embodiments of the present invention, reference is now made to the following descriptions taken in connection with the accompanying drawings in which:

FIG. 1a shows an example of a multi-camera system as a simplified block diagram, in accordance with an embodiment;

FIG. 1b shows a perspective view of a multi-camera system, in accordance with an embodiment;

FIG. 2b illustrates image stitching, projection, and mapping processes, in accordance with an embodiment;

FIG. 2c illustrates a process of generating a projected picture representing two views, one for each eye, and mapping both views onto the same packed picture, in accordance with an embodiment;

FIG. 2d illustrates a process of forming a monoscopic equirectangular panorama picture, in accordance with an embodiment;

FIGS. 3a-3f illustrate some conversions from a spherical picture to a packed picture that can be used in content authoring and the corresponding conversions from a packed picture to a spherical picture to be rendered that can be used in a player, in accordance with an embodiment;

FIG. 7b illustrates an example of using MPEG-DASH preselection feature for tile or sub-picture tracks of different bitrates;

FIG. 9a shows some elements of a video encoder, in accordance with an embodiment;

FIG. 9b shows some elements of a video decoder, in accordance with an embodiment;

FIG. 10a shows a flow chart of an encoding method, in accordance with an embodiment;

FIG. 10b shows a flow chart of a decoding method, in accordance with an embodiment;

FIG. 14 further shows schematically electronic devices employing embodiments of the invention connected using wireless and wired network connections.

DETAILED DESCRIPTION OF SOME EXAMPLE EMBODIMENTS

Figure 2A:
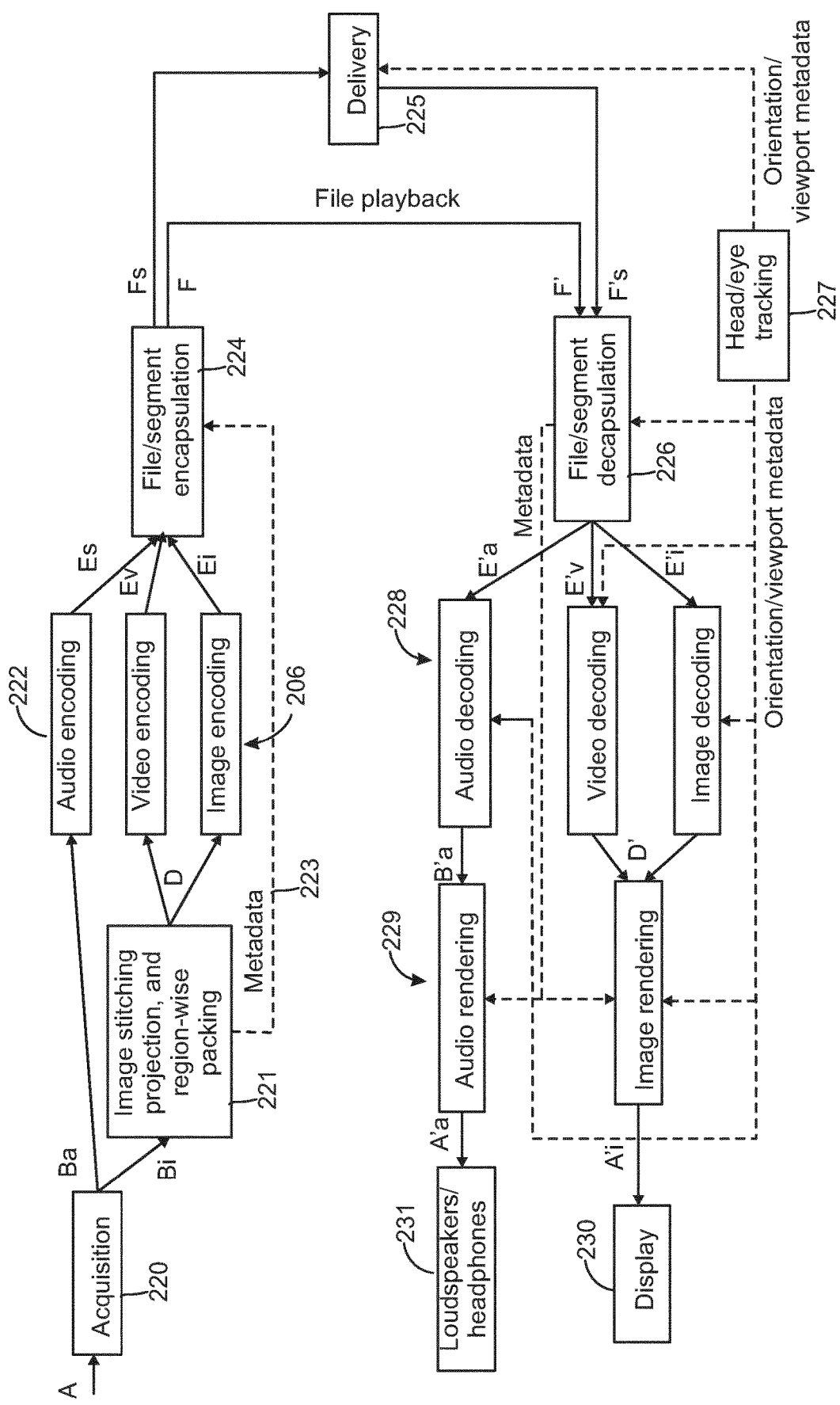
FIG. 2a illustrates a process of encoding and decoding 360-degree video using omnidirectional media format, in accordance with an embodiment.

In the following, several embodiments of the invention will be described in the context of one video coding arrangement. It is to be noted, however, that the invention is not limited to this particular arrangement. In fact, the different embodiments have applications widely in any environment where improvement of coding when switching between coded fields and frames is desired. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

In the following, several embodiments are described using the convention of referring to (de)coding, which indicates that the embodiments may apply to decoding and/or encoding.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team—Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

Some key definitions, bitstream and coding structures, and concepts of H.264/AVC and HEVC and some of their extensions are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The aspects of the invention are not limited to H.264/AVC or HEVC or their extensions, but rather the description is given for one possible basis on top of which the invention may be partly or fully realized.

In the description of existing standards as well as in the description of example embodiments, a syntax element may be defined as an element of data represented in the bitstream. A syntax structure may be defined as zero or more syntax elements present together in the bitstream in a specified order.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoder may be referred to as a decoded picture.

The source and decoded pictures may each be comprised of one or more sample arrays, such as one of the following sets of sample arrays:

Luma (Y) only (monochrome).

Luma and two chroma (YCbCr or YCgCo).

Green, Blue and Red (GBR, also known as RGB).

Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use may be indicated e.g. in a coded bitstream e.g. using the Video Usability Information (VUI) syntax of H.264/AVC and/or HEVC. A component may be defined as an array or a single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

A partitioning may be defined as a division of a set into subsets such that each element of the set is in exactly one of the subsets. A picture partitioning may be defined as a division of a picture into smaller non-overlapping units. A block partitioning may be defined as a division of a block into smaller non-overlapping units, such as sub-blocks. In some cases term block partitioning may be considered to cover multiple levels of partitioning, for example partitioning of a picture into slices, and partitioning of each slice into smaller units, such as macroblocks of H.264/AVC. It is noted that the same unit, such as a picture, may have more than one partitioning. For example, a coding unit of HEVC may be partitioned into prediction units and separately by another quadtree into transform units.

A coded picture is a coded representation of a picture.

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighbouring macroblock or CU may be regarded as unavailable for intra prediction, if the neighbouring macroblock or CU resides in a different slice.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

A basic coding unit in HEVC is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In HEVC, pictures are divided into slices and tiles. A slice may be a sequence of treeblocks but (when referring to a so-called fine granular slice) may also have its boundary within a treeblock at a location where a transform unit and prediction unit coincide. The fine granular slice feature was included in some drafts of HEVC but is not included in the finalized HEVC standard. Treeblocks within a slice are coded and decoded in a raster scan order. The division of a picture into slices is a partitioning.

In HEVC, a tile is defined as an integer number of treeblocks co-occurring in one column and one row, ordered consecutively in the raster scan within the tile. The division of a picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

A distinction between coding units and coding treeblocks may be defined for example as follows. A slice may be defined as a sequence of one or more coding tree units (CTU) in raster-scan order within a tile or within a picture if tiles are not in use. Each CTU may comprise one luma coding treeblock (CTB) and possibly (depending on the chroma format being used) two chroma CTBs. A CTU may be defined as a coding tree block of luma samples, two corresponding coding tree blocks of chroma samples of a picture that has three sample arrays, or a coding tree block of samples of a monochrome picture or a picture that is coded using three separate colour planes and syntax structures used to code the samples. The division of a slice into coding tree units may be regarded as a partitioning. A CTB may be defined as an N×N block of samples for some value of N. The division of one of the arrays that compose a picture that has three sample arrays or of the array that compose a picture in monochrome format or a picture that is coded using three separate colour planes into coding tree blocks may be regarded as a partitioning. A coding block may be defined as an N×N block of samples for some value of N. The division of a coding tree block into coding blocks may be regarded as a partitioning.

In HEVC, a slice may be defined as an integer number of coding tree units contained in one independent slice segment and all subsequent dependent slice segments (if any) that precede the next independent slice segment (if any) within the same access unit. An independent slice segment may be defined as a slice segment for which the values of the syntax elements of the slice segment header are not inferred from the values for a preceding slice segment. A dependent slice segment may be defined as a slice segment for which the values of some syntax elements of the slice segment header are inferred from the values for the preceding independent slice segment in decoding order. In other words, only the independent slice segment may have a "full" slice header. An independent slice segment may be conveyed in one NAL unit (without other slice segments in the same NAL unit) and likewise a dependent slice segment may be conveyed in one NAL unit (without other slice segments in the same NAL unit).

In HEVC, a coded slice segment may be considered to comprise a slice segment header and slice segment data. A slice segment header may be defined as part of a coded slice segment containing the data elements pertaining to the first or all coding tree units represented in the slice segment. A slice header may be defined as the slice segment header of the independent slice segment that is a current slice segment or the most recent independent slice segment that precedes a current dependent slice segment in decoding order. Slice segment data may comprise an integer number of coding tree unit syntax structures.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures.

A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The NAL unit header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication (called nal_unit_type), a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, layer identifier, LayerId, nuh_layer_id and layer_id are used interchangeably unless otherwise indicated.

In HEVC extensions nuh_layer_id and/or similar syntax elements in NAL unit header carries scalability layer information. For example, the LayerId value nuh_layer_id and/or similar syntax elements may be mapped to values of variables or syntax elements describing different scalability dimensions.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header. A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit. An AU typically contains all the coded pictures that represent the same output time and/or capturing time.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream.

A byte stream format has been specified in H.264/AVC and HEVC for transmission or storage environments that do not provide framing structures. The byte stream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the byte stream format is in use or not. The bit order for the byte stream format may be specified to start with the most significant bit (MSB) of the first byte, proceed to the least significant bit (LSB) of the first byte, followed by the MSB of the second byte, etc. The byte stream format may be considered to consist of a sequence of byte stream NAL unit syntax structures. Each byte stream NAL unit syntax structure may be considered to comprise one start code prefix followed by one NAL unit syntax structure, as well as trailing and/or heading padding bits and/or bytes.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set.

Note that sample locations used in inter prediction may be saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary.

The temporal motion-constrained tile sets SEI message of HEVC can be used to indicate the presence of motion-constrained tile sets in the bitstream.

A motion-constrained picture is such that the inter prediction process is constrained in encoding such that no sample value outside the picture, and no sample value at a fractional sample position that is derived using one or more sample values outside the picture, would be used for inter prediction of any sample within the picture and/or sample locations used for prediction need not be saturated to be within picture boundaries.

It may be considered that in stereoscopic or two-view video, one video sequence or view is presented for the left eye while a parallel view is presented for the right eye. More than two parallel views may be needed for applications which enable viewpoint switching or for autostereoscopic displays which may present a large number of views simultaneously and let the viewers to observe the content from different viewpoints.

A view may be defined as a sequence of pictures representing one camera or viewpoint. The pictures representing a view may also be called view components. In other words, a view component may be defined as a coded representation of a view in a single access unit. In multiview video coding, more than one view is coded in a bitstream. Since views are typically intended to be displayed on stereoscopic or multiview autostereoscopic display or to be used for other 3D arrangements, they typically represent the same scene and are content-wise partly overlapping although representing different viewpoints to the content. Hence, inter-view prediction may be utilized in multiview video coding to take advantage of inter-view correlation and improve compression efficiency. One way to realize inter-view prediction is to include one or more decoded pictures of one or more other views in the reference picture list(s) of a picture being coded or decoded residing within a first view. View scalability may refer to such multiview video coding or multiview video bitstreams, which enable removal or omission of one or more coded views, while the resulting bitstream remains conforming and represents video with a smaller number of views than originally.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence, as explained in more details in the next paragraph. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

In frame-compatible stereoscopic video (a.k.a. frame packing of stereoscopic video), a spatial packing of a stereo pair into a single frame is performed at the encoder side as a pre-processing step for encoding and then the frame-packed frames are encoded with a conventional 2D video coding scheme. The output frames produced by the decoder contain constituent frames of a stereo pair.

In a typical operation mode, the spatial resolution of the original frames of each view and the packaged single frame have the same resolution. In this case the encoder downsamples the two views of the stereoscopic video before the packing operation. The spatial packing may use for example a side-by-side or top-bottom format, and the downsampling should be performed accordingly.

Frame packing may be preferred over multiview video coding (e.g. MVC extension of H.264/AVC or MV-HEVC extension of H.265/HEVC) for example due to the following reasons:

The post-production workflows might be tailored for a single video signal. Some post-production tools might not be able to handle two separate picture sequences and/or might not be able to keep the separate picture sequences in synchrony with each other.

The distribution system, such as transmission protocols, might be such that support single coded sequence only and/or might not be able to keep separate coded sequences in synchrony with each other and/or may require more buffering or latency to keep the separate coded sequences in synchrony with each other.

The decoding of bitstreams with multiview video coding tools may require support of specific coding modes, which might not be available in players. For example, many smartphones support H.265/HEVC Main profile decoding but are not able to handle H.265/HEVC Multiview Main profile decoding even though it only requires high-level additions compared to the Main profile.

Frame packing may be inferior to multiview video coding in terms of compression performance (a.k.a. rate-distortion performance) due to, for example, the following reasons. In frame packing, inter-view sample prediction and inter-view motion prediction are not enabled between the views. Furthermore, in frame packing, motion vectors pointing outside the boundaries of the constituent frame (to another constituent frame) or causing sub-pixel interpolation using samples outside the boundaries of the constituent frame (within another constituent frame) may be sub-optimally handled. In conventional multiview video coding, the sample locations used in inter prediction and sub-pixel interpolation may be saturated to be within the picture boundaries or equivalently areas outside the picture boundary in the reconstructed pictures may be padded with border sample values.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISOBMFF is the base for derivation of all the above mentioned file formats (excluding the ISOBMFF itself).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format). A track may be regarded as a logical channel.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The restricted video ('resv') sample entry and mechanism has been specified for the ISOBMFF in order to handle situations where the file author requires certain actions on the player or renderer after decoding of a visual track. Players not recognizing or not capable of processing the required actions are stopped from decoding or rendering the restricted video tracks. The 'resv' sample entry mechanism applies to any type of video codec. A RestrictedSchemeInfoBox is present in the sample entry of 'resv' tracks and comprises a OriginalFormatBox, SchemeTypeBox, and SchemeInformationBox. The original sample entry type that would have been unless the 'resv' sample entry type were used is contained in the OriginalFormatBox. The SchemeTypeBox provides an indication which type of processing is required in the player to process the video. The SchemeInformationBox comprises further information of the required processing. The scheme type may impose requirements on the contents of the SchemeInformationBox. For example, the stereo video scheme indicated in the SchemeTypeBox indicates that when decoded frames either contain a representation of two spatially packed constituent frames that form a stereo pair (frame packing) or only one view of a stereo pair (left and right views in different tracks). StereoVideoBox may be contained in SchemeInformationBox to provide further information e.g. on which type of frame packing arrangement has been used (e.g. side-by-side or top-bottom).

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec may comprise an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate). A video encoder may be used to encode an image sequence, as defined subsequently, and a video decoder may be used to decode a coded image sequence. A video encoder or an intra coding part of a video encoder or an image encoder may be used to encode an image, and a video decoder or an inter decoding part of a video decoder or an image decoder may be used to decode a coded image.

Some hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

There may be different types of intra prediction modes available in a coding scheme, out of which an encoder can select and indicate the used one, e.g. on block or coding unit basis. A decoder may decode the indicated intra prediction mode and reconstruct the prediction block accordingly. For example, several angular intra prediction modes, each for different angular direction, may be available. Angular intra prediction may be considered to extrapolate the border samples of adjacent blocks along a linear prediction direction. Additionally or alternatively, a planar prediction mode may be available. Planar prediction may be considered to essentially form a prediction block, in which each sample of a prediction block may be specified to be an average of vertically aligned sample in the adjacent sample column on the left of the current block and the horizontally aligned sample in the adjacent sample line above the current block. Additionally or alternatively, a DC prediction mode may be available, in which the prediction block is essentially an average sample value of a neighboring block or blocks.

One outcome of the coding procedure is a set of coding parameters, such as motion vectors and quantized transform coefficients. Many parameters can be entropy-coded more efficiently if they are predicted first from spatially or temporally neighbouring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 8A:
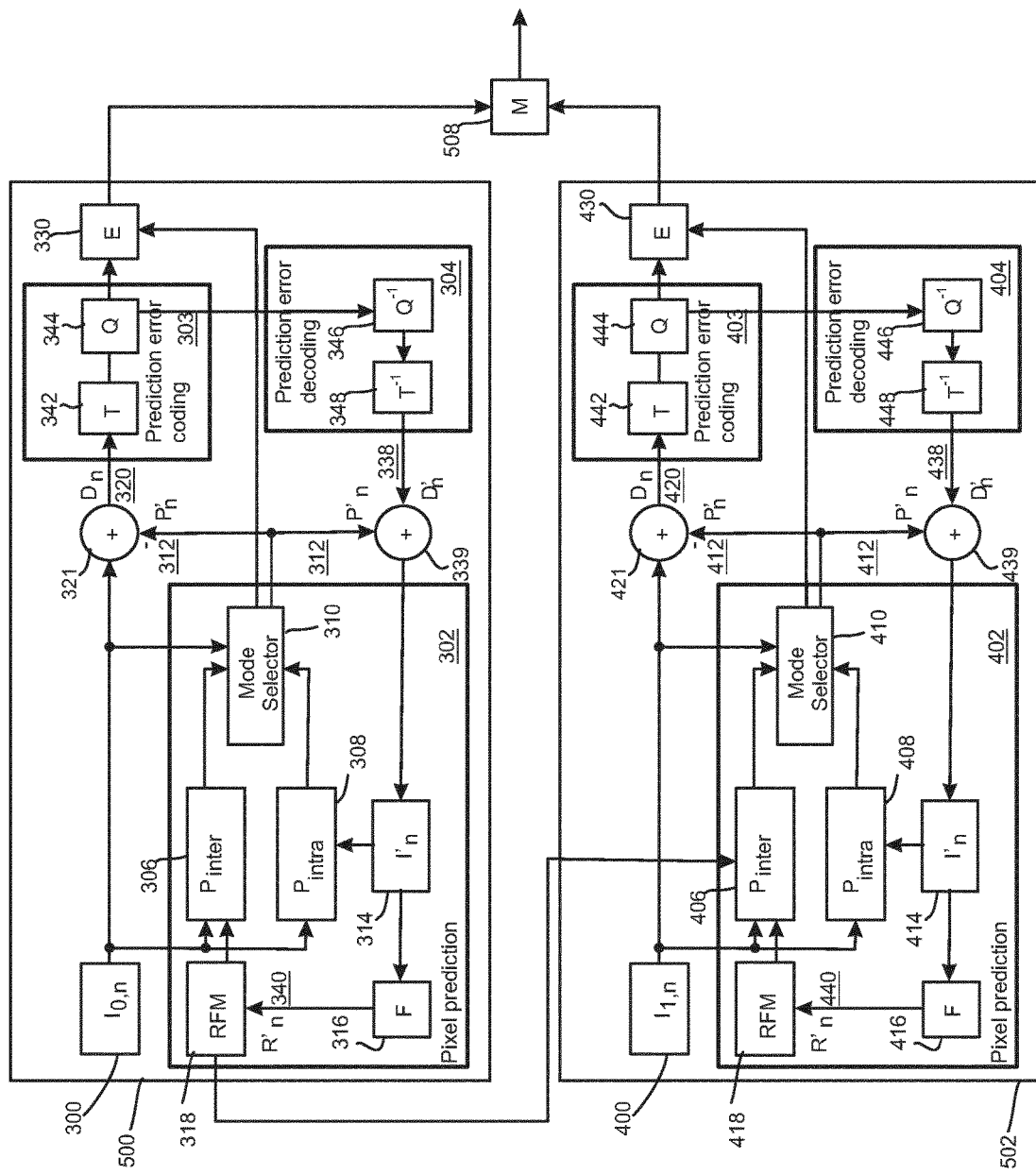
FIG. 8a shows a schematic diagram of an encoder suitable for implementing embodiments of the invention.

FIG. 8a shows a block diagram of a video encoder suitable for employing embodiments of the invention. FIG. 8a presents an encoder for two layers, but it would be appreciated that presented encoder could be similarly simplified to encode only one layer or extended to encode more than two layers. FIG. 8a illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 8a also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Figure 8B:
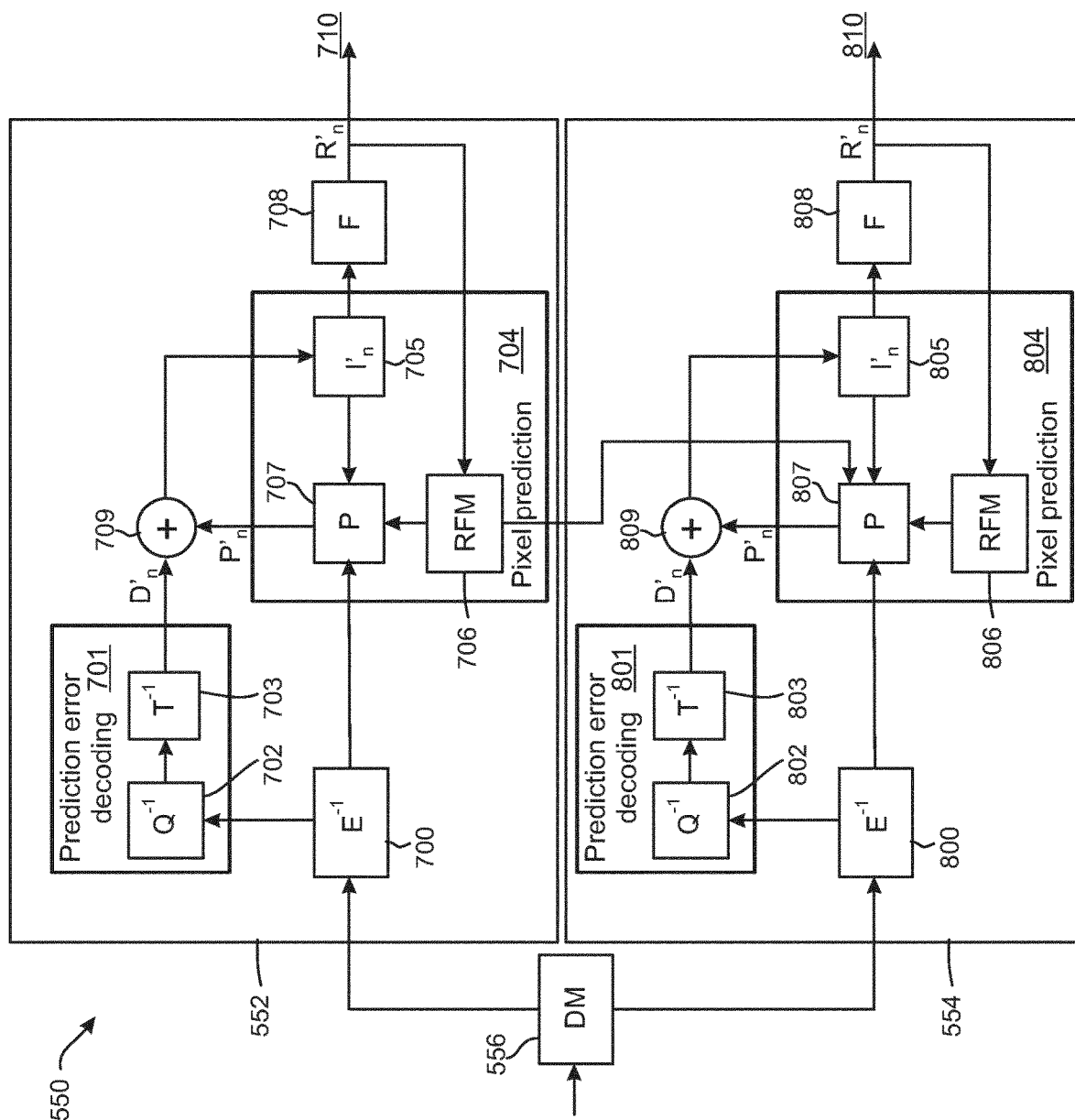
FIG. 8b shows a schematic diagram of a decoder suitable for implementing embodiments of the invention.

FIG. 8b shows a block diagram of a video decoder suitable for employing embodiments of the invention. FIG. 8b depicts a structure of a two-layer decoder, but it would be appreciated that the decoding operations may similarly be employed in a single-layer decoder.

The video decoder 550 comprises a first decoder section 552 for base layer pictures and a second decoder section 554 for enhancement layer pictures. Block 556 illustrates a demultiplexer for delivering information regarding base layer pictures to the first decoder section 552 and for delivering information regarding enhancement layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform (T−1). Blocks 702, 802 illustrate inverse quantization (Q−1). Blocks 700, 800 illustrate entropy decoding (E−1). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base or enhancement layer pictures to obtain the preliminary reconstructed images (I'n). Preliminary reconstructed and filtered base layer pictures may be output 710 from the first decoder section 552 and preliminary reconstructed and filtered enhancement layer pictures may be output 810 from the second decoder section 554.

Herein, the decoder could be interpreted to cover any operational unit capable to carry out the decoding operations, such as a player, a receiver, a gateway, a demultiplexer and/or a decoder.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

FIGS. 1a and 1b illustrate an example of a camera having multiple lenses and imaging sensors but also other types of cameras may be used to capture wide view images and/or wide view video.

In the following, the terms wide view image and wide view video mean an image and a video, respectively, which comprise visual information having a relatively large viewing angle, larger than 100 degrees. Hence, a so called 360 panorama image/video as well as images/videos captured by using a fish eye lens may also be called as a wide view image/video in this specification. More generally, the wide view image/video may mean an image/video in which some kind of projection distortion may occur when a direction of view changes between successive images or frames of the video so that a transform may be needed to find out co-located pixels from a reference image or a reference frame. This will be described in more detail later in this specification.

The camera 100 of FIG. 1a comprises two or more camera units 102 and is capable of capturing wide view images and/or wide view video. In this example the number of camera units 102 is eight, but may also be less than eight or more than eight. Each camera unit 102 is located at a different location in the multi-camera system and may have a different orientation with respect to other camera units 102. As an example, the camera units 102 may have an omnidirectional constellation so that it has a 360 viewing angle in a 3D-space. In other words, such camera 100 may be able to see each direction of a scene so that each spot of the scene around the camera 100 can be viewed by at least one camera unit 102.

The camera 100 of FIG. 1a may also comprise a processor 104 for controlling the operations of the camera 100. There may also be a memory 106 for storing data and computer code to be executed by the processor 104, and a transceiver 108 for communicating with, for example, a communication network and/or other devices in a wireless and/or wired manner. The camera 100 may further comprise a user interface (UI) 110 for displaying information to the user, for generating audible signals and/or for receiving user input. However, the camera 100 need not comprise each feature mentioned above, or may comprise other features as well. For example, there may be electric and/or mechanical elements for adjusting and/or controlling optics of the camera units 102 (not shown).

FIG. 1a also illustrates some operational elements which may be implemented, for example, as a computer code in the software of the processor, in a hardware, or both. A focus control element 114 may perform operations related to adjustment of the optical system of camera unit or units to obtain focus meeting target specifications or some other predetermined criteria. An optics adjustment element 116 may perform movements of the optical system or one or more parts of it according to instructions provided by the focus control element 114. It should be noted here that the actual adjustment of the optical system need not be performed by the apparatus but it may be performed manually, wherein the focus control element 114 may provide information for the user interface 110 to indicate a user of the device how to adjust the optical system.

FIG. 1b shows as a perspective view the camera 100 of FIG. 1a. In FIG. 1b seven camera units 102a-102g can be seen, but the camera 100 may comprise even more camera units which are not visible from this perspective. FIG. 1b also shows two microphones 112a, 112b, but the apparatus may also comprise one or more than two microphones.

It should be noted here that embodiments disclosed in this specification may also be implemented with apparatuses having only one camera unit 102 or less or more than eight camera units 102a-102g.

In accordance with an embodiment, the camera 100 may be controlled by another device (not shown), wherein the camera 100 and the other device may communicate with each other and a user may use a user interface of the other device for entering commands, parameters, etc. and the user may be provided information from the camera 100 via the user interface of the other device.

Terms 360-degree video or virtual reality (VR) video may be used interchangeably. They may generally refer to video content that provides such a large field of view that only a part of the video is displayed at a single point of time in typical displaying arrangements. For example, a virtual reality video may be viewed on a head-mounted display (HMD) that may be capable of displaying e.g. about 100-degree field of view (FOV). The spatial subset of the virtual reality video content to be displayed may be selected based on the orientation of the head-mounted display. In another example, a flat-panel viewing environment is assumed, wherein e.g. up to 40-degree field-of-view may be displayed. When displaying wide field of view content (e.g. fisheye) on such a display, it may be preferred to display a spatial subset rather than the entire picture.

MPEG omnidirectional media format (OMAF) may be described with FIGS. 2a, 2b and 2c.

360-degree image or video content may be acquired and prepared for example as follows, with reference to FIG. 2a. A real-world audio-visual scene (A) is captured 220 by audio sensors as well as a set of cameras or a camera device with multiple lenses and imaging sensors. The acquisition results in a set of digital image/video signals (Bi) and audio (Ba) signal. The cameras/lenses may cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals typically conform to one of the loudspeaker layouts defined in the MPEG Coding-Independent Code Points standard (CICP). In an omnidirectional media application, the loudspeaker layout signals of the rendered immersive audio program are binauralized for presentation via headphones.

The images (Bi) of the same time instance are stitched, projected, and mapped 221 onto a packed picture (D). The breakdown of image stitching, projection, and mapping processes are illustrated with FIG. 2b and described as follows. Input images (Bi) 201 are stitched and projected 202 onto a three-dimensional projection structure, such as a sphere or a cube. The projection structure may be considered to comprise one or more surfaces, such as plane(s) or part(s) thereof. A projection structure may be defined as a three-dimensional structure consisting of one or more surface(s) on which the captured virtual reality image/video content may be projected, and from which a respective projected picture can be formed. The image data on the projection structure is further arranged onto a two-dimensional projected picture (C) 203. The term projection may be defined as a process by which a set of input images are projected onto a projected frame. There may be a pre-defined set of representation formats of the projected frame, including for example an equirectangular projection (ERP) format and a cube map projection (CMP) format. It may be considered that the projected picture covers the entire sphere.

Region-wise mapping 204 may be applied to map projected pictures 203 onto one or more packed pictures 205, and this picture may be given as input to image/video encoding 206. Otherwise, regions of the projected picture are mapped onto a packed picture (D) by indicating the location, shape, and size of each region in the packed picture, and the packed picture (D) is given as input to image/video encoding 206. The term region-wise packing may be defined as a process by which a projected picture is mapped to a packed picture. The term packed picture may be defined as a picture that results from region-wise packing of a projected picture.

In the case of stereoscopic 360-degree video, the input images of one time instance are stitched to generate a projected picture representing two views, one for each eye. Both views can be mapped onto the same packed picture, as described below in relation to the FIG. 2c, and encoded by a 2D video encoder. Alternatively, each view of the projected picture can be mapped to its own packed picture, in which case the image stitching, projection, and region-wise packing is like described above with the FIG. 2b. A sequence of packed pictures of either the left view or the right view can be independently coded or, when using a multiview video encoder, predicted from the other view.

The breakdown of image stitching, projection, and region-wise packing process for stereoscopic content where both views are mapped onto the same packed picture is illustrated with FIG. 2c and described as follows. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding 206. If the region-wise packing is not applied, the packed picture may be identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

Packing information may be encoded as metadata in or along the bitstream. For example, the packing information may comprise a region-wise mapping from a pre-defined or indicated source format to the packed frame format, e.g. from a projected frame to a packed VR frame, as described earlier. The region-wise mapping information may for example comprise for each mapped region a source rectangle in the projected frame and a destination rectangle in the packed VR frame, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which VR projection format is used, region-wise quality ranking indicating the picture quality ranking between regions and/or first and second spatial region sequences, one or more transformation operations, such as rotation by 90, 180, or 270 degrees, horizontal mirroring, and vertical mirroring.

Among others, region-wise packing provides signalling for the following usage scenarios:

1) Additional compression for viewport-independent projections is achieved by densifying sampling of different regions to achieve more uniformity across the sphere. For example, the top and bottom parts of ERP are over-sampled, and region-wise packing can be applied to down-sample them horizontally.
2) Arranging the faces of plane-based projection formats, such as cube map projection, in an adaptive manner.
3) Generating viewport-dependent bitstreams that use viewport-independent projection formats. For example, regions of ERP or faces of CMP can have different sampling densities and the underlying projection structure can have different orientations.
4) Indicating regions of the packed pictures represented by an extractor track. This is needed when an extractor track collects tiles from bitstreams of different resolutions.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic content may have less than 360-degree horizontal field-of-view and up to 180-degree vertical field-of-view, while otherwise have the characteristics of equirectangular projection format.

In cube map projection (CMP) format, spherical video is projected onto the six faces (a.k.a. sides) of a cube. The cube map may be generated e.g. by first rendering the spherical scene six times from a viewpoint, with the views defined by an 90 degree view frustum representing each cube face. The cube sides may be frame-packed into the same frame or each cube side may be treated individually (e.g. in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

The process of forming a monoscopic equirectangular panorama picture is illustrated in FIG. 2d, in accordance with an embodiment. A set of input images 211, such as fisheye images of a camera array or a camera device 100 with multiple lenses and sensors 102, is stitched 212 onto a spherical image 213. The spherical image 213 is further projected 214 onto a cylinder 215 (without the top and bottom faces). The cylinder 215 is unfolded 216 to form a two-dimensional projected frame 217. In practice one or more of the presented steps may be merged; for example, the input images 211 may be directly projected onto a two-dimensional projected frame 217 without an intermediate projection onto the sphere 213 and/or to the cylinder 215. The projection structure for equirectangular panorama may be considered to be a cylinder that comprises a single surface.

The equirectangular projection may be defined as a process that converts any sample location within the projected picture (of the equirectangular projection format) to angular coordinates of a coordinate system. The sample location within the projected picture may be defined relative to pictureWidth and pictureHeight, which are the width and height, respectively, of the equirectangular panorama picture in samples. In the following, let the center point of a sample location along horizontal and vertical axes be denoted as i and j, respectively. The angular coordinates ($\phi$, $\theta$) for the sample location, in degrees, are given by the following equirectangular mapping equations: $\phi=(i\div pictureWidth-0.5)*360$, $\theta=(0.5-j\div pictureHeight)*180$.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

A packed region may be defined as a region in a packed picture that is mapped to a projected region as specified by the region-wise packing signaling. A projected region may be defined as a region in a projected picture that is mapped to a packed region as specified by the region-wise packing signaling. A sphere region may be defined as a region on a sphere, which may further be constrained by the means to specify the sphere region, which may include but might not be limited to specifying the region either by four great circles or by two yaw circles and two pitch circles. A great circle may be defined as an intersection of the sphere and a plane that passes through the center point of the sphere. A great circle is also known as an orthodrome or Riemannian circle. The center of the sphere and the center of a great circle are co-located. A pitch circle may be defined as a circle on the sphere connecting all points with the same pitch value. A yaw circle may be defined as a circle on the sphere connecting all points with the same yaw value. A sphere region may further require a point within the region, such as the center point of the region, to make it distinct from another sphere region that would otherwise be defined with the same parameters (e.g., the same great circles).

A full-picture-compliant tile set {track|bitstream} is a tile set {track|bitstream} that conforms to the full-picture {track|bitstream} format. Here, the notation {optionA|optionB} illustrates alternatives, i.e. either optionA or optionB, which is selected consistently in all selections. A full-picture-compliant tile set track can be played as with any full-picture track using the parsing and decoding process of full-picture tracks. A full-picture-compliant bitstream can be decoded as with any full-picture bitstream using the decoding process of full-picture bitstreams. A full-picture track is a track representing an original bitstream (including all its tiles). A tile set bitstream is a bitstream that contains a tile set of an original bitstream but not representing the entire original bitstream. A tile set track is a track representing a tile set of an original bitstream but not representing the entire original bitstream.

A full-picture-compliant tile set track may comprise extractors as defined for HEVC. An extractor may for example be an in-line constructor including a slice segment header and a sample constructor extracting coded video data for a tile set from a referenced full-picture track.

A sub-picture may be defined as a region, such as a tile or a tile rectangle, of a picture. A sub-picture track may be defined as a track that represents a sub-picture sequence, i.e. a region of a picture sequence and conforms to a conventional track format, such as 'hvc1' or 'hev1' defined for HEVC in ISO/IEC 14496-15. In an approach to generate sub-picture tracks, a source picture sequence is split into sub-picture sequences before encoding. Each sub-picture sequence covers a subset of the spatial area of the source content, such as full panorama content, which may e.g. be of equirectangular projection format. A sub-picture sequence is then encoded independently from other sub-picture sequences as a single-layer bitstream, such as HEVC Main profile bitstream. The coded single-layer bitstream is encapsulated into a sub-picture track. The bitstream for a sub-picture track may be encoded with motion-constrained pictures, as defined later. In another approach to generate sub-picture tracks, a source picture sequence is encoded with motion-constrained tile sets into a bitstream, a full-picture-compliant tile set bitstream is generated from the bitstream, and a sub-picture track is generated by encapsulating the full-picture-compliant tile set bitstream into a track. Sub-picture tracks generated this way comprise motion-constrained pictures. Several bitstreams may be encoded from the same sub-picture sequence, e.g. for different bitrates.

A motion-constrained coded sub-picture sequence may be defined as a collective term of such a coded sub-picture sequence in which the coded pictures are motion-constrained pictures, as defined earlier, and an MCTS sequence. Depending on the context of using the term motion-constrained coded sub-picture sequence, it may be interpreted to mean either one or both of a coded sub-picture sequence in which the coded pictures are motion-constrained pictures, as defined earlier, and/or an MCTS sequence.

A collector track may be defined as a track that extracts implicitly or explicitly MCTSs or sub-pictures from other tracks. A collector track may be a full-picture-compliant track. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. A tile base track may be regarded as a collector track, and an extractor track that extracts MCTSs or sub-pictures from other tracks may be regarded as a collector track. A collector track may also be referred to as a collection track. A track that is a source for extracting to a collector track may be referred to as a collection item track.

In sub-picture based streaming, each sub-picture bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In an example of sub-picture based encoding and streaming, each cube face may be separately encoded and encapsulated in its own track (and Representation). More than one encoded bitstream for each cube face may be provided, e.g. each with different spatial resolution. Players can choose tracks (or Representations) to be decoded and played based on the current viewing orientation. High-resolution tracks (or Representations) may be selected for the cube faces used for rendering for the present viewing orientation, while the remaining cube faces may be obtained from their low-resolution tracks (or Representations).

In an approach of tile-based encoding and streaming, encoding is performed in a manner that the resulting bitstream comprises motion-constrained tile sets. Several bitstreams of the same source content are encoded using motion-constrained tile sets.

In an approach, one or more motion-constrained tile set sequences are extracted from a bitstream, and each extracted motion-constrained tile set sequence is stored as a tile track (e.g. an HEVC tile track) or a sub-picture track in a file. A collector track (e.g. an HEVC tile base track or a full picture track comprising extractors to extract data from the tile or sub-picture tracks) may be generated and stored in a file. The collector track represents the bitstream by implicitly collecting motion-constrained tile sets from the tile tracks or by explicitly extracting (e.g. by HEVC extractors) motion-constrained tile sets from the sub-picture tracks. Tile or sub-picture tracks and the collector track of each bitstream may be encapsulated in an own file, and the same track identifiers may be used in all files. At the receiver side the tile or sub-picture tracks to be streamed may be selected based on the viewing orientation. The client may receive tile or sub-picture tracks covering the entire omnidirectional content. Better quality or higher resolution tile or sub-picture tracks may be received for the current viewport compared to the quality or resolution covering the remaining, currently non-visible viewports.

In an example, equirectangular panorama content is encoded using motion-constrained tile sets. More than one encoded bitstream may be provided, e.g. with different spatial resolution and/or picture quality. Each motion-constrained tile set is made available in its own track (and Representation). Players can choose tracks (or Representations) to be decoded and played based on the current viewing orientation. High-resolution or high-quality tracks (or Representations) may be selected for tile sets covering the present primary viewport, while the remaining area of the 360-degree content may be obtained from low-resolution or low-quality tracks (or Representations).

In an approach, each received tile or sub-picture track is decoded with a separate decoder or decoder instance.

In another approach, a tile base track is utilized in decoding as follows. If all the received tile tracks originate from bitstreams of the same resolution (or more generally if the tile base tracks of the bitstreams are identical or equivalent, or if the initialization segments or other initialization data, such as parameter sets, of all the bitstreams is the same), a tile base track may be received and used to construct a bitstream. The constructed bitstream may be decoded with a single decoder.

In yet another approach, a first set of sub-picture tracks and/or tile tracks may be merged into a first full-picture-compliant bitstream, and a second set of sub-picture tracks and/or tile tracks may be merged into a second full-picture-compliant bitstream. The first full-picture-compliant bitstream may be decoded with a first decoder or decoder instance, and the second full-picture-compliant bitstream may be decoded with a second decoder or decoder instance. In general, this approach is not limited to two sets of sub-picture tracks and/or tile tracks, two full-picture-compliant bitstreams, or two decoders or decoder instances, but applies to any number of them. With this approach, the client can control the number of parallel decoders or decoder instances. Moreover, clients that are not capable of decoding tile tracks (e.g. HEVC tile tracks) but only full-picture-compliant bitstreams can perform the merging in a manner that full-picture-compliant bitstreams are obtained. The merging may be solely performed in the client or full-picture-compliant tile tracks may be generated to assist in the merging performed by the client.

The term tile merging (in coded domain) may be defined as a process to merge coded sub-picture sequences and/or coded MCTS sequences, which may have been encapsulated as sub-picture tracks and tile tracks, respectively, into a full-picture-compliant bitstream. A creation of a collector track may be regarded as tile merging that is performed by the file creator. Resolving a collector track into a full-picture-compliant bitstream may be regarded as tile merging, which is assisted by the collector track.

It is also possible to combine the first approach (viewport-specific encoding and streaming) and the second approach (tile-based encoding and streaming) above.

It needs to be understood that tile-based encoding and streaming may be realized by splitting a source picture in sub-picture sequences that are partly overlapping. Alternatively or additionally, bitstreams with motion-constrained tile sets may be generated from the same source content with different tile grids or tile set grids. We could then imagine the 360 degrees space divided into a discrete set of viewports, each separate by a given distance (e.g., expressed in degrees), so that the omnidirectional space can be imagined as a map of overlapping viewports, and the primary viewport is switched discretely as the user changes his/her orientation while watching content with a head-mounted display. When the overlapping between viewports is reduced to zero, the viewports could be imagined as adjacent non-overlapping tiles within the 360 degrees space.

Region-wise packing information may be encoded as metadata in or along the bitstream. For example, the packing information may comprise a region-wise mapping from a pre-defined or indicated source format to the packed frame format, e.g. from a projected picture to a packed picture, as described earlier.

Rectangular region-wise packing metadata is described next: For each region, the metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

For audio, the stitching process is not needed, since the captured signals are inherently immersive and omnidirectional.

The stitched images (D) are encoded 206 as coded images (Ei) or a coded video bitstream (Ev). The captured audio (Ba) is encoded 222 as an audio bitstream (Ea). The coded images, video, and/or audio are then composed 224 into a media file for file playback (F) or a sequence of an initialization segment and media segments for streaming (Fs), according to a particular media container file format. In this specification, the media container file format is the ISO base media file format. The file encapsulator 224 also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

The segments Fs are delivered 225 using a delivery mechanism to a player.

The file that the file encapsulator outputs (F) may be identical to the file that the file decapsulator inputs (F'). A file decapsulator 226 processes the file (F') or the received segments (F's) and extracts the coded bitstreams (E'a, E'v, and/or E'i) and parses the metadata. The audio, video, and/or images are then decoded 228 into decoded signals (B'a for audio, and D' for images/video). The decoded packed pictures (D') are projected 229 onto the screen of a head-mounted display or any other display device 230 based on the current viewing orientation or viewport and the projection, spherical coverage, projection structure orientation, and region-wise packing metadata parsed from the file. Likewise, decoded audio (B'a) is rendered 229, e.g. through headphone 231$s$, according to the current viewing orientation. The current viewing orientation is determined by the head tracking and possibly also eye tracking functionality. Besides being used by the renderer 229 to render the appropriate part of decoded video and audio signals, the current viewing orientation may also be used by video and audio decoders 228 for decoding optimization.

The process described above is applicable to both live and on-demand use cases.

In 360-degree systems, a coordinate system may be defined through orthogonal coordinate axes X (lateral), Y (vertical, pointing upwards), and Z (back-to-front axis, pointing outwards) that may be used for defining yaw ($\phi$), pitch ($\theta$), and roll angles. Yaw may be defined to rotate around the Y axis, pitch around the X axis, and roll around the Z axis. Rotations may be defined to be extrinsic, i.e., around the X, Y, and Z fixed reference axes. The angles may be defined to increase clockwise when looking from the origin towards the positive end of an axis.

Global coordinate axes may be defined as coordinate axes, e.g. according to the coordinate system as discussed above, that are associated with audio, video, and images representing the same acquisition position and intended to be rendered together. The origin of the global coordinate axes is usually the same as the center point of a device or rig used for omnidirectional audio/video acquisition as well as the position of the observer's head in the three-dimensional space in which the audio and video tracks are located. In the absence of the initial viewpoint metadata, the playback may be recommended to be started using the orientation (0, 0, 0) in (yaw, pitch, roll) relative to the global coordinate axes.

As mentioned above, the projection structure may be rotated relative to the global coordinate axes. The rotation may be performed for example to achieve better compression performance based on the spatial and temporal activity of the content at certain spherical parts. Alternatively or additionally, the rotation may be performed to adjust the rendering orientation for already encoded content. For example, if the horizon of the encoded content is not horizontal, it may be adjusted afterwards by indicating that the projection structure is rotated relative to the global coordinate axes. The projection orientation may be indicated as yaw, pitch, and roll angles that define the orientation of the projection structure relative to the global coordinate axes. The projection orientation may be included e.g. in a box in a sample entry of an ISOBMFF track for omnidirectional video.

Conversion Operations for Spherical Video

FIGS. 3a-3f illustrate some conversions from a spherical picture to a packed picture that can be used in content authoring and the corresponding conversions from a packed picture to a spherical picture to be rendered that can be used in a player. The projection structure is aligned with a global coordinate system, as is illustrated in FIG. 3a, when the equator 130 of the equirectangular panorama picture is aligned with the X axis of the global coordinate axes, the Y axis of the equirectangular panorama picture is aligned with the Y axis of the global coordinate axes, and the Z axis of the global coordinate axes passes through the middle point 131 of the equirectangular panorama picture.

The content authoring can include the following steps. The projection structure can be rotated relative to the global coordinate axes, as indicated FIG. 3b. The orientation angle may be indicated in the ProjectionOrientationBox. The local coordinate axes of the projection structure are the axis of the coordinate system that has been rotated as specified by e.g. ProjectionOrientationBox. The video or image does not need to cover the entire sphere. The coverage may be indicated as an area enclosed by two yaw circles and two pitch circles given in e.g. CoverageInformationBox. The yaw and pitch circles are indicated relative the local coordinate axes. FIG. 3c illustrates (for simplicity) a coverage that is constrained only by two pitch circles 132 while yaw values are not constrained. It should be noted that the yaw range indicated by the CoverageInformationBox is allowed to cross the "back seam", i.e. yaw values greater than 180° or less than 180° can be indicated with CoverageInformationBox.

On a two-dimensional (2D) equirectangular domain, the coverage information corresponds to a rectangle. For instance, FIG. 3d indicates the 2D correspondence of FIG. 3c. The X and Y axes of this 2D representation are aligned with the X and Y local coordinate axes of the projection structure. The projected picture may consists of only the part indicated by the CoverageInformationBox, as illustrated by FIG. 3e.

Rectangular region-wise packing can be applied to obtain a packed picture from the projected picture. One example of packing is depicted in FIG. 3f. In this example, the side regions are horizontally downsampled, while the middle region is kept at its original resolution.

In order to map a sample location of a packed picture (such as that in FIG. 30 to a projection structure used in rendering FIG. 3a, the player may perform sequential mappings in reverse order from the packed frame of FIG. 3f to the projection structure of FIG. 3a.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. An extractor track may be defined as a track that contains one or more extractors.

Extractors may be defined as structures that are stored in samples and extract coded video data from other tracks by reference when processing the track in a player. Extractors enable compact formation of tracks that extract coded video data by reference.

Extractors specified in ISO/IEC 14496-15 for H.264/AVC and HEVC extract NAL unit data from other tracks by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. The following constructors are specified:

a) A sample constructor extracts, by reference, NAL unit data from a sample of another track.

b) An in-line constructor includes NAL unit data.

When an extractor is processed by a file reader that requires it, the extractor is logically replaced by the bytes resulting when resolving the contained constructors in their appearance order.

Nested extraction may be disallowed, e.g. the bytes referred to by a sample constructor shall not contain extractors; an extractor shall not reference, directly or indirectly, another extractor.

An extractor may contain one or more constructors for extracting data from the current track or from another track that is linked to the track in which the extractor resides by means of a track reference of type 'scal'.

The bytes of a resolved extractor are one of the following:
a) One entire NAL unit; note that when an Aggregator is referenced, both the included and referenced bytes are copied
b) More than one entire NAL unit In both cases the bytes of the resolved extractor start with a valid length field and a NAL unit header.

The bytes of a sample constructor are copied only from the single identified sample in the track referenced through the indicated 'scal' track reference. The alignment is on decoding time, i.e. using a time-to-sample table only, followed by a counted offset in sample number. Extractors are a media-level concept and hence apply to the destination track before any edit list is considered. However, one would normally expect that the edit lists in the two tracks would be identical.

The following syntax may be used:

```
class aligned(8) Extractor ( ) {
    NALUnitHeader( );
    do {
        unsigned int(8)    constructor_type;
        if( constructor_type == 0 )
            SampleConstructor( );
        else if( constructor_type == 2 )
            InlineConstructor( );
    } while( !EndOfNALUnit( ) )
}
```

The semantics may be defined as follows:
NALUnitHeader( ) is the first two bytes of HEVC NAL units. A particular nal_unit_type value indicates an extractor, e.g. nal_unit_type equal to 49.
constructor_type specifies the constructor being used.
EndOfNALUnit( ) is a function that returns 0 (false) when more data follows in this extractor; otherwise it returns 1 (true).

The sample constructor (SampleConstructor) may have the following syntax:

```
class aligned(8) SampleConstructor ( ) {
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
``` track_ref_index identifies the source track from which data is extracted. track_ref_index is the index of the track reference of type 'scal'. The first track reference has the index value 1; the value 0 is reserved.

The sample in that track from which data is extracted is temporally aligned or nearest preceding in the media decoding timeline, i.e. using the time-to-sample table only, adjusted by an offset specified by sample_offset with the sample containing the extractor.

sample_offset gives the relative index of the sample in the linked track that shall be used as the source of information. Sample 0 (zero) is the sample with the same, or the closest preceding decoding time compared to the decoding time of the sample containing the extractor; sample 1 (one) is the next sample, sample −1 (minus 1) is the previous sample, and so on.

data_offset is the offset of the first byte within the reference sample to copy. If the extraction starts with the first byte of data in that sample, the offset takes the value 0.

data_length is the number of bytes to copy.

The syntax of the in-line constructor may be specified as follows:

```
class aligned(8) InlineConstructor ( ) {
    unsigned int(8) length;
    unsigned int(8) inline_data[length];
}
``` length is the number of bytes that belong to the InlineConstructor following this field, and inline_data is the data bytes to be returned when resolving the in-line constructor.

Figure 4A:
FIG. 4a shows a left view captured by a multi-view camera.
Figure 4B:
FIG. 4b shows a right view captured by the multi-view camera.
Figure 4C:
FIG. 4c shows the absolute difference image between the left and right views of FIGS. 4a and 4b, in accordance with an embodiment.

It may happen that a relatively large part of one view of stereoscopic panorama content captured by a multi-view camera may be identical to the other view of the stereoscopic panorama content. In an example, more than ⅓rd of a left or right view of stereoscopic panorama content captured by a multi-view camera is identical to the other view. In this example multi-view camera this is caused by the lens constellation, which only captures the backside of the multi-view camera with two lenses without enough overlap for stereo depth estimation. Hence, captured content from the backside of the multi-view camera is not suitable for stereoscopic panorama reproduction. This area may be called as a monoscopic area in this specification. This type of video or image content where an area is monoscopic while the remaining picture area is stereoscopic may be referred to as partially stereoscopic content. This issue is illustrated in FIGS. 4a-4c. FIG. 4a shows the left view, FIG. 4b shows the right view, and FIG. 4c shows the absolute difference image between the left and right views.

Even for camera setups that are capable of full 360-degree stereoscopic capture, it may be a desired bitrate allocation choice to represent only a certain region, such as the front hemisphere, in stereoscopic format and the remaining area in monoscopic format. In such partially stereoscopic format, the stereoscopic disparity may be gradually decreased towards the monoscopic area so that the viewing experience remains pleasant.

In order to facilitate correct rendering on stereoscopic displays, such as typical head-mounted displays, partially stereoscopic formats conventionally include a full representation of both views, e.g. in a stereoscopic frame-packed manner.

Applying video coding methods to partially stereoscopic image content may be suboptimal. For example, when no inter-view prediction is in use, the two views are compressed entirely without taking their inter-view correlation into account. Thus, more than ⅓ of the second view may be unnecessarily coded and may cause a respective unnecessary bitrate penalty. Even if inter-view prediction were in use, the monoscopic area of the second view may be unnecessarily decoded and may consume decoding resources. 360-degree video may be of high temporal and spatial resolution and can be on the limit of decoding capacity.

In accordance with an embodiment, the monoscopic area of a second view is not coded but indicated to be identical to the respective area of the first view.

There may be several signaling methods to indicate that the monoscopic area of a second view is not coded but may be identical to the respective area of the first view.

In accordance with an embodiment, a region-wise packing may be implemented. The monoscopic area of a packed picture is contained by a first region and a second region. The first region and the second region may be the same or one may be a superset of the other. For example, the first region may consist of the entire picture of a first view, and the second region may consist of the monoscopic area(s) entirely or partially and exclude other areas. The second region is indicated to correspond to a region of a second view in the projected picture comprising a left projected picture and a right projected picture that are arranged as a side-by-side frame-packed stereoscopic equirectangular panorama.

Figure 5A:
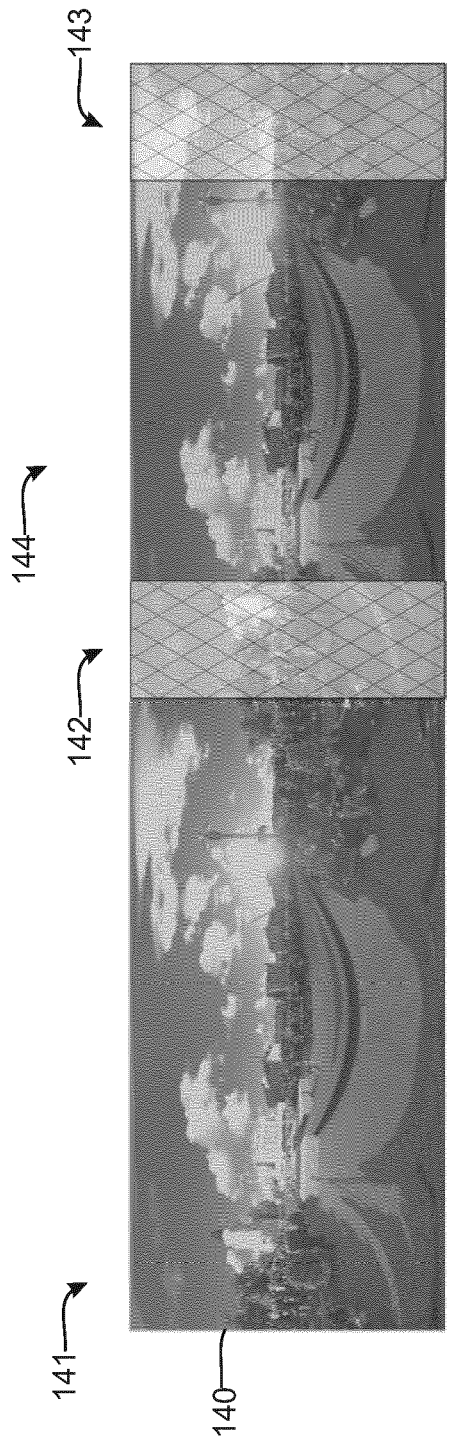
FIGS. 5a and 5b illustrate a region-wise packing, in accordance with an embodiment.
Figure 5B:
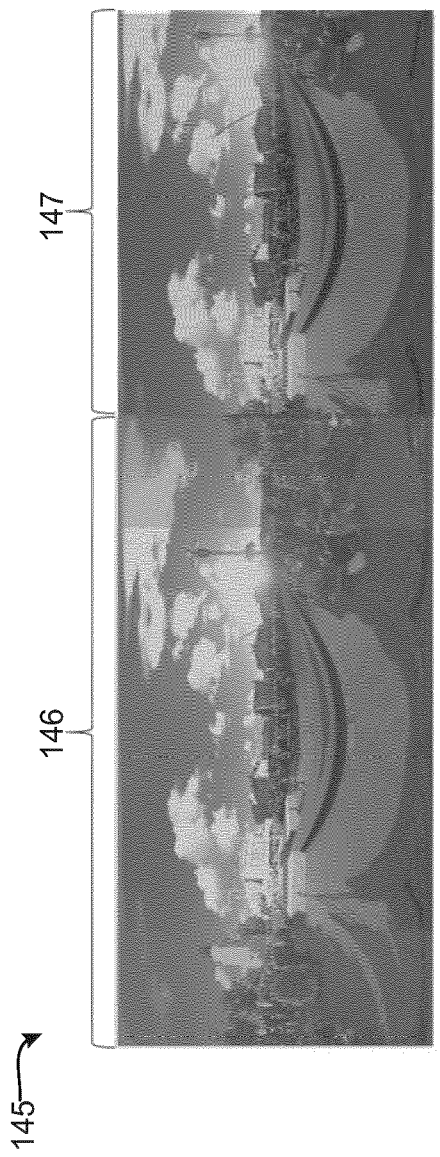

FIGS. 5a and 5b illustrate this embodiment. FIG. 5a depicts a stereoscopic image 140 having a left view and a right view. Four regions are specified for the packed picture 140. The first region 141 covers the entire left-view picture, the second region 142 covers the left-side monoscopic part of the left view (indicated by the hatched area near the middle of FIG. 5a), the third region 143 covers the right-side monoscopic part of the left view (indicated by the hatched area at the right hand side of FIG. 5a), and the fourth region 144 covers the coded right view, which excludes the monoscopic regions, which in this example is between the hatched areas.

The respective four regions are indicated for the projected picture, which forms a side-by-side frame-packed stereoscopic equirectangular panorama 145.

FIG. 5b illustrates the packed picture 145 produced from the projected picture of FIG. 5a. In FIG. 5b only the monoscopic area of the right view is shown, i.e. the regions of the right view belonging to the monoscopic area are excluded from the right view.

As a part of the content preparation, region-wise packing, in which the projected picture comprising the left projected picture and the right projected picture as a side-by-side frame-packed stereoscopic equirectangular panorama is converted to the packed picture, can be carried out. As a part of playing, region-wise unpacking, in which the decoded packed picture 145 is converted to a side-by-side frame-packed stereoscopic equirectangular panorama 140, can be carried out. Alternatively, regions of the decoded picture can be directly mapped onto the rendering mesh. The first region 141 and the third region 143 can be mapped to both the left-view rendering mesh and the right-view rendering mesh.

In accordance with another embodiment, view-specific coverage information may be utilized e.g. as follows. The spherical coverage of the content is indicated separately for each view. It may be inferred or explicitly indicated that for non-overlapping areas, as determined by the view-specific coverage, content from the other view is copied for reconstructing a picture with a "full" field of view. For example, it may be indicated in or along the bitstream that the spherical coverage of the first view is 360 and 180 degrees in yaw range and pitch range, respectively, the spherical coverage of the second view is 180 and 180 degrees in yaw and pitch range, respectively, and that for rendering the content for viewing, the remaining spherical area of the second view (i.e., the back side hemisphere in this example) is copied from the respective area of the first view.

In an embodiment, coverage is indicated as spherical coverage similarly to the GlobalCoverageInformationBox of OMAF, or the omnidirectional projection indication SEI message specified for HEVC. The spherical coverage may be indicated as a yaw and pitch range. Additionally, the spherical coverage may be associated with a yaw and pitch angle of a center point of the covered region, and the roll angle of the covered region. The shape of the sphere region defining the spherical coverage may be pre-defined or indicated. For example, the shape type may be defined to be four great circles, or two yaw circles and two pitch circles. The spherical coverage may be indicated separately for the left and right views, when the content is stereoscopic. The spherical coverage indication may include or be associated with an indication, such as a flag, whether to copy, as a part of rendering the content for viewing, respective areas of a first view to a second view, when the first view covers a broader field of view than that of the second view, to fill in the field of view of the second view to be equal to that of the first view.

Figure 6A:
FIGS. 6a-6c shows an example of indicating a monoscopic area by using a parameter, in accordance with an embodiment.
Figure 6B:
Figure 6C:

In an embodiment, the coverage is indicated as a one-dimensional (1D) coordinate x, as illustrated in FIGS. 6a, 6b and 6c. FIG. 6a shows an example of a left view having width X. A width of a first region of the monoscopic area (indicated with the dotted line in FIG. 6a) may be indicated by x, wherein the value of x may be transmitted or attached with the encoded content. In FIG. 6b an encoded right view is shown. The encoded right view has the width X0, which is less than X. FIG. 6c shows a reconstructed right view, in which the monoscopic area from the left view has been added, one region to the left (the hatched region to the left of x) and another region to the right (the hatched region to the right of x+X0). Similarly to described above, it may be inferred or explicitly indicated that for non-overlapping areas, as determined by the one-dimensional coordinate, content from the other view is copied for reconstructing a picture with a "full" field of view.

The one-dimensional coordinate x may be indicated for example in one of the following units: luma sample units, yaw value or range in degrees, yaw value or range in radians.

In an embodiment, the coverage is non-symmetric and may be indicated with two one-dimensional coordinates, or one one-dimensional coordinate and a one-dimensional range.

Alternatively, left-side and right-side coverage or monoscopic values may be indicated separately.

In accordance with yet another embodiment, motion-constrained tile sets may be copied by reference. In an embodiment, the entire monoscopic area within the first view, or a subset of the monoscopic area within the first view, is coded as one or more motion-constrained tile sets or alike, which do not contain any stereoscopic areas. This monoscopic area is excluded from the second-view pictures that are encoded. The first view and the second view are coded as separate bitstreams. The coded first view is encapsulated into a first track and the coded second view is encapsulated into a second track.

In an embodiment, the second track copies by reference the motion-constrained tile sets containing monoscopic area(s) from the first track, e.g. by using extractors of ISO/IEC 14496-15 or alike. The second track also includes natively the coded second-view pictures. High-level syntax, such as parameter sets and slice headers, may need to be modified so that the resulting bitstream is conforming, e.g. by modifying the width and height to contain the extracted motion-constrained tile sets. This embodiment is illustrated with FIGS. 7a and 7b.

Figure 7A:
FIGS. 7a and 7b show copying motion-constrained tile sets by reference, in accordance with an embodiment.
Figure 7B:
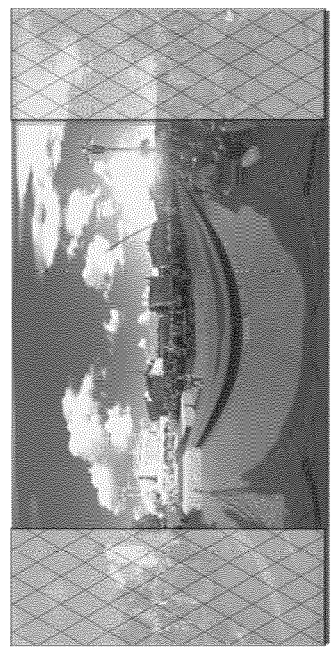

FIG. 7a shows a left view track and FIG. 7b shows a right-view track. The left-view track comprises motion constrained tile set(s) of the left view and the right-view track comprises extractors for copying by reference from the left-view track.

In an embodiment, a third track copies by reference the motion-constrained tile sets containing monoscopic-area(s) from the first track and copies by reference coded video data of the second track. High-level syntax, such as parameter sets and slice headers, may need to be modified so that the resulting bitstream is conforming, e.g. by modifying the width and height to contain the extracted motion-constrained tile sets.

A composition picture may be defined as a picture that is suitable to be presented and is obtained from the decoding outputs of time-aligned samples of all tracks of a sub-picture composition track group by arranging them spatially as specified by the syntax elements of the sub-picture composition track group.

Time alignment may be in decoding time or presentation time. TrackGroupTypeBox with track_group_type equal to 'spco' indicates that this track belongs to a composition of tracks that can be spatially arranged to obtain composition pictures. The visual tracks mapped to this grouping (i.e. the visual tracks that have the same value of track_group_id within TrackGroupTypeBox with track_group_type equal to 'spco') collectively represent visual content that can be presented. Each individual visual track mapped to this grouping may or may not be intended to be presented alone without other visual tracks, while composition pictures are suitable to be presented.

In an embodiment, a monoscopic-area track comprises a coded sub-picture sequence for a monoscopic area, a left-view track comprises a coded sub-picture sequence for stereoscopic area of the left view, and a right-view track comprises a coded sub-picture sequence for stereoscopic area of the right view. A sub-picture composition track group is formed from the monoscopic-area track, a left-view track, and a right-view track. The composition picture is indicated to be frame-packed, e.g. side-by-side or top-bottom frame-packed. The monoscopic-area track contains two TrackGroupTypeBoxes with track_group_type equal to 'spco' and with the same value of track_group_id. One of these boxes maps the monoscopic-area track onto the left-view constituent picture within the composition picture, and the other box maps the monoscopic-area track onto the right-view constituent picture within the composition picture.

It should be noted here that the embodiments presented above may also be applied similarly to depth coding. For example, a depth map of a left view and a depth map of a right view may contain areas for which the depth information is the same. Then, only the depth map information of that area of one view may need to be encoded and transmitted.

While embodiments have been described above with reference to content authoring (including encoding and file encapsulation), it needs to be understood that similar embodiments can be authored for the client side.

The video encoding method according to an example embodiment will now be described with reference to the simplified block diagram of FIG. 9a and the flow diagram of FIG. 10a. The elements of FIG. 9a may, for example, be implemented by the first encoder section 500 of the encoder of FIG. 8a, or they may be separate from the first encoder section 500.

The encoder section 500 may encode an input picture sequence into a bitstream or receive 521 a bitstream. The bitstream comprises a coded first-view picture and a coded second-view picture. The coded second-view picture represents a smaller field of view than the coded first-view picture. An encapsulating element 511 encapsulates 522 the coded first-view picture and the coded second-view picture of the bitstream. An indication element 512 inserts 523 an indication in or along the bitstream that a reconstructed second-view picture comprises the decoded second-view picture and at least one region of the decoded first-view picture, wherein the reconstructed second-view picture represents the same field of view as the decoded first-view picture.

The encoding result may be outputted 524 from the output 513 of the encoding section 500 to be, for example, transmitted to another entity, e.g. to a network server or to a consumer end device, and/or saved to a storage device such as a memory.

The video decoding method according to the invention may be described with reference to the simplified block diagram of FIG. 9b and the flow diagram of FIG. 10b. The elements of FIG. 9b may, for example, be implemented in the first decoder section 552 of the decoder of FIG. 8b, or they may be separate from the first decoder section 552.

As an input, a bitstream 610 comprising a coded first-view picture and a coded second-view picture is received 611 by the decoding section 600 and may be stored 612 in a picture buffer 601. The coded second-view picture represents a smaller field of view than the coded first-view picture. A decoding element 602 decodes 613 the coded first-view picture, wherein the decoding results into a decoded first-view picture. The decoding element 602 also decodes 614 the coded second-view picture, wherein the decoding results into a decoded second-view picture. The decoding element 602 further decodes 615 from or along the bitstream an indication that a reconstructed second-view picture comprises the decoded second-view picture and at least one region of the decoded first-view picture, wherein the reconstructed second-view picture represents the same field of view as the decoded first-view picture. A reconstructing element 603 reconstructs 616 the reconstructed second-view picture accordingly. The obtained image data may be output 617 at the output 604 of the decoding section 600 and used to display images of the input picture sequence.

Figure 11:
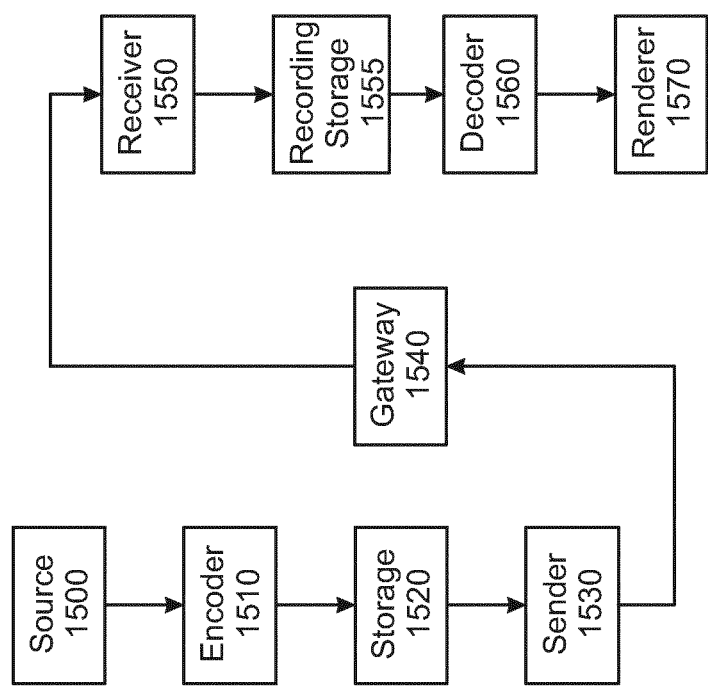
FIG. 11 shows a schematic diagram of an example multimedia communication system within which various embodiments may be implemented.

FIG. 11 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Hypertext Transfer Protocol (HTTP), Transmission Control Protocol (TCP), and Internet Protocol (IP). When the communication protocol stack is packet-oriented, the server 1540 encapsulates the coded media bitstream into packets. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions.

The system includes one or more receivers 1560, typically capable of receiving, de-modulating, and decapsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality.

The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices. A sender 1540 and/or a gateway 1550 may be configured to perform switching between different representations e.g. for view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 580 is multi-tasking and uses computing resources for other purposes than decoding the scalable video bitstream. In another example, faster decoding operation might be needed when content is played back at a faster pace than the normal playback speed, e.g. twice or three times faster than conventional real-time playback rate. The speed of decoder operation may be changed during the decoding or playback for example as response to changing from a fast-forward play from normal playback rate or vice versa, and consequently multiple layer up-switching and layer down-switching operations may take place in various orders.

In the above, some embodiments have been described with reference to a particular number of monoscopic areas (such as 1 or 2) and particular location(s) and size(s) of monoscopic areas. It needs to be understood that embodiments are not constrained on any particular number of monoscopic areas or any particular location(s) or size(s) of monoscopic areas.

In the above, some embodiments have been described with reference to frame-packed stereoscopic video. It needs to be understood that embodiments apply similarly to separately coded views.

In the above, some embodiments have been described with reference to the term block. It needs to be understood that the term block may be interpreted in the context of the terminology used in a particular codec or coding format. For example, the term block may be interpreted as a prediction unit in HEVC. It needs to be understood that the term block may be interpreted differently based on the context it is used. For example, when the term block is used in the context of motion fields, it may be interpreted to match to the block grid of the motion field.

In the above, some embodiments have been described with reference to terminology of particular codecs, most notably HEVC. It needs to be understood that embodiments can be similarly realized with respective terms of other codecs. For example, rather than tiles or tile sets, embodiments could be realized with rectangular slice groups of H.264/AVC.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. In the above, some embodiments have been described with reference to encoding or including indications or metadata in the bitstream and/or decoding indications or metadata from the bitstream. It needs to be understood that indications or metadata may additionally or alternatively be encoded or included along the bitstream and/or decoded along the bitstream. For example, indications or metadata may be included in or decoded from a container file that encapsulates the bitstream.

In the above, some embodiments have been described with reference to including metadata or indications in or along a container file and/or parsing or decoding metadata and/or indications from or along a container file. It needs to be understood that indications or metadata may additionally or alternatively be encoded or included in the video bitstream, for example as SEI message(s) or VUI, and/or decoded in the video bitstream, for example from SEI message(s) or VUI.

Figure 13:
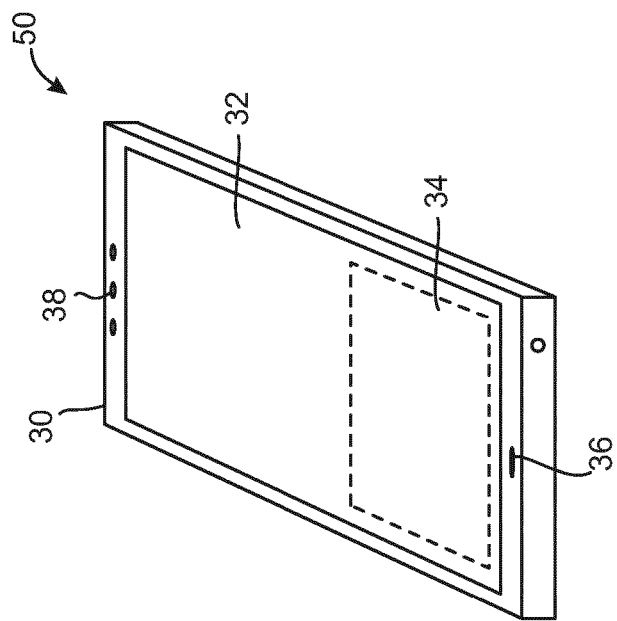
FIG. 13 shows schematically a user equipment suitable for employing embodiments of the invention.
Figure 12:
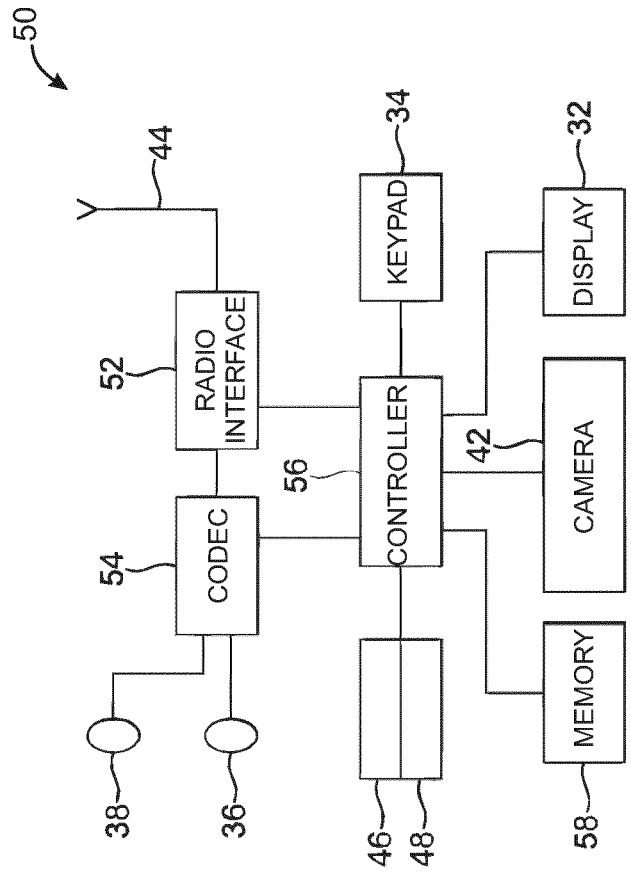
FIG. 12 shows schematically an electronic device employing embodiments of the invention.

The following describes in further detail suitable apparatus and possible mechanisms for implementing the embodiments of the invention. In this regard reference is first made to FIG. 12 which shows a schematic block diagram of an exemplary apparatus or electronic device 50 depicted in FIG. 13, which may incorporate a transmitter according to an embodiment of the invention.

The electronic device 50 may for example be a mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/FireWire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and a universal integrated circuit card for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 60 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

With respect to FIG. 14, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a global systems for mobile communications (GSM), universal mobile telecommunications system (UMTS), long term evolution (LTE) based network, code division multiple access (CDMA) network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 14 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising at least one processor and at least one non-transitory memory, said at least one memory stored with code thereon, which when executed by said at least one processor, causes the apparatus to perform at least:
   encode or encapsulating a bitstream comprising a coded first-view picture and a coded second-view picture, wherein:
      the coded first-view picture and the coded second-view picture form a partially stereoscopic content, wherein the partially stereoscopic content comprises a stereoscopic region and a monoscopic region;
      the coded second-view picture represents a smaller field of view than the coded first-view picture;
      decode of the coded first-view picture results in a decoded first-view picture; and
      decode of the coded second-view picture results in a decoded second-view picture; and
   indicate in or along the bitstream that a reconstructed second-view picture comprises the decoded second-view picture and at least one region of the decoded first-view picture, wherein the reconstructed second-view picture represents the same field of view as the decoded first-view picture.

2. The apparatus of claim 1 further comprising:
   decoding of a coded picture to form a decoded picture, wherein the coded picture comprises the decoded first-view picture and the decoded second-view picture; and
   indicating in or along the bitstream a mapping between respective regions of the decoded picture and regions of a frame-packed picture, wherein the decoded first-view picture and the reconstructed second-view picture jointly form a frame-packed picture comprising a first-view constituent picture and a second-view constituent picture.

3. The apparatus of claim 1, wherein the decoded first-view picture and the reconstructed second-view picture comprise a monoscopic area, the apparatus further comprising:
   encoding or encapsulating the monoscopic area into the coded first-view picture and excluding the monoscopic area from the coded second-view picture.

4. The apparatus of claim 3, wherein a mapping comprises:
   a first region of the decoded picture covering the decoded first-view picture mapped to the first-view constituent picture of the frame-packed picture;
   a second region of the decoded picture covering a left-side of the monoscopic area of the decoded first-view picture mapped to a second region within the second-view constituent picture of the frame-packed picture;
   a third region of the decoded picture covering a right-side of the monoscopic area of the decoded first-view picture mapped to a third region within the second-view constituent picture of the frame-packed picture; and
   a fourth region of the decoded picture covering the decoded second-view picture, which excludes the monoscopic area, mapped to a fourth region within the second-view constituent picture of the frame-packed picture.

5. The apparatus claim 1, further comprising:
   indicating, in or along the bitstream, a spherical coverage of the coded first-view picture and the coded second-view picture separately for each view.

6. The apparatus claim 1, further comprising:
   indicating, in or along the bitstream, one-dimensional coordinate indicative of a location of a border between an overlapping area and a non-overlapping area in the coded first-view picture.

7. The apparatus of claim 5, further comprising:
   indicating in or along the bitstream that for the non-overlapping spherical coverage or area, content from the first view is copied for reconstructing the reconstructed second-view picture.

8. The apparatus claim 3, further comprising:
   encoding at least a part of the monoscopic area within the coded first-view picture as one or more motion-constrained tile sets, which do not contain any stereoscopic areas.

9. The apparatus of the claim 1, further comprising:
   encapsulating the coded first-view into a first track; and encapsulating the coded second-view into a second track.

10. The apparatus of claim 3, wherein the at least one region of the decoded first-view picture included in the reconstructed second-view picture is the monoscopic area of the decoded first-view picture.

11. An apparatus comprising at least one processor and at least one non-transitory memory, said at least one memory stored with code thereon, which when executed by said at least one processor, causes the apparatus to perform at least:
   receive a bitstream comprising a coded first-view picture and a coded second-view picture, wherein the coded first-view picture and the coded second-view picture form a partially stereoscopic content, wherein the partially stereoscopic content comprises a stereoscopic region and a monoscopic region, and wherein the coded second-view picture represents a smaller field of view than the coded first-view picture;
   decode the coded first-view picture, wherein the decoding results into a decoded first-view picture;
   decode the coded second-view picture, wherein the decoding results into a decoded second-view picture;
   decode from or along a bitstream that a reconstructed second-view picture comprises the decoded second-view picture and at least one region of the decoded first-view picture, wherein the reconstructed second-view picture represents the same field of view as the decoded first-view picture, and
   reconstruct the reconstructed second-view picture accordingly.

12. The apparatus of claim 11, further comprising:
   decoding of a coded picture to form a decoded picture, wherein the coded picture comprises the decoded first-view picture and the decoded second-view picture; and
   decoding in or along the bitstream a mapping between respective regions of the decoded picture and regions of a frame-packed picture, wherein the decoded first-view picture and the reconstructed second-view picture jointly form a frame-packed picture comprising a first-view constituent picture and a second-view constituent picture.

13. The apparatus of claim 11, wherein the field of view comprises a monoscopic area, the apparatus further comprising:
   decoding or decapsulating the monoscopic area from the coded first-view picture.

14. The apparatus of claim 11, further comprising:
decoding, from or along the bitstream, a separate indication of a spherical coverage of the coded first-view picture and the coded second-view picture for each view.

15. The apparatus of claim 11, further comprising:
decoding, from or along the bitstream, one-dimensional coordinate indicative of a location of a border between an overlapping area and a non-overlapping area in the coded first-view picture.

16. The apparatus of claim 14, further comprising:
decoding from or along the bitstream an indication that for non-overlapping spherical coverage or area, content from the first view is copied for reconstructing the reconstructed second-view picture.

17. A method, comprising:
encoding or encapsulating a bitstream comprising a coded first-view picture and a coded second-view picture, wherein
the coded first-view picture and the coded second-view picture form a partially stereoscopic content, wherein the partially stereoscopic content comprises a stereoscopic region and a monoscopic region,
the coded second-view picture represents a smaller field of view than the coded first-view picture,
decoding of the coded first-view picture results in a decoded first-view picture,
decoding of the coded second-view picture results in a decoded second-view picture; and
indicating in or along the bitstream that a reconstructed second-view picture comprises the decoded second-view picture and at least one region of the decoded first-view picture, wherein the reconstructed second-view picture represents the same field of view as the decoded first-view picture.

18. A method, comprising:
receiving a bitstream comprising a coded first-view picture and a coded second-view picture, wherein the coded first-view picture and the coded second-view picture form a partially stereoscopic content, wherein the partially stereoscopic content comprises a stereoscopic region and a monoscopic region, and wherein the coded second-view picture represents a smaller field of view than the coded first-view picture,
decoding the coded first-view picture, wherein the decoding results into a decoded first-view picture,
decoding the coded second-view picture, wherein the decoding results into a decoded second-view picture,
decoding from or along a bitstream that a reconstructed second-view picture comprises the decoded second-view picture and at least one region of the decoded first-view picture, wherein the reconstructed second-view picture represents the same field of view as the decoded first-view picture, and
reconstructing the reconstructed second-view picture accordingly.

19. The method of claim 18, further comprising:
decoding of a coded picture to form a decoded picture, wherein the coded picture comprises the decoded first-view picture and the decoded second-view picture; and
decoding in or along the bitstream a mapping between respective regions of the decoded picture and regions of a frame-packed picture, wherein the decoded first-view picture and the reconstructed second-view picture jointly form a frame-packed picture comprising a first-view constituent picture and a second-view constituent picture.

20. A computer readable non-transitory storage medium comprising code for use by an apparatus, which when executed by a processor, causes the apparatus to perform at least:
obtain a first coded tile or sub-picture track and a second coded tile or sub-picture track, the first and second coded tile or sub-picture tracks representing a different spatial part of an input video sequence, and the first and second coded tile or sub-picture tracks having the same width and height in pixels;
encode or encapsulate a bitstream comprising a coded first-view picture and a coded second-view picture, wherein
the coded first-view picture and the coded second-view picture form a partially stereoscopic content, wherein the partially stereoscopic content comprises a stereoscopic region and a monoscopic region,
the coded second-view picture represents a smaller field of view than the coded first-view picture,
decoding of the coded first-view picture results in a decoded first-view picture,
decoding of the coded second-view picture results in a decoded second-view picture, and
indicate in or along the bitstream that a reconstructed second-view picture comprises the decoded second-view picture and at least one region of the decoded first-view picture, wherein the reconstructed second-view picture represents the same field of view as the decoded first-view picture.

21. A computer readable non-transitory storage medium comprising code for use by an apparatus, which when executed by a processor, causes the apparatus to perform at least:
receive a bitstream comprising a coded first-view picture and a coded second-view picture, wherein the coded first-view picture and the coded second-view picture form a partially stereoscopic content, wherein the partially stereoscopic content comprises a stereoscopic region and a monoscopic region, and wherein the coded second-view picture represents a smaller field of view than the coded first-view picture,
decode the coded first-view picture, wherein the decoding results into a decoded first-view picture,
decode the coded second-view picture, wherein the decoding results into a decoded second-view picture,
decode from or along a bitstream that a reconstructed second-view picture comprises the decoded second-view picture and at least one region of the decoded first-view picture, wherein the reconstructed second-view picture represents the same field of view as the decoded first-view picture, and
reconstruct the reconstructed second-view picture accordingly.

* * * * *